(12) United States Patent
Shekhar

(10) Patent No.: US 12,632,826 B2
(45) Date of Patent: **\*May 19, 2026**

(54) IMMERSIVE SUPPLY CHAIN ANALYTICS USING MIXED REALITY

(71) Applicant: Blue Yonder Group, Inc., Scottsdale, AZ (US)

(72) Inventor: Tushar Shekhar, Bangalore (IN)

(73) Assignee: Blue Yonder Group, Inc., Scottsdale, AZ (US)

( \* ) Notice: Subject to any disclaimer, the term of this patent is extended or adjusted under 35 U.S.C. 154(b) by 70 days.

This patent is subject to a terminal disclaimer.

(21) Appl. No.: 18/737,122

(22) Filed: Jun. 7, 2024

(65) Prior Publication Data

US 2024/0320623 A1 Sep. 26, 2024

Related U.S. Application Data

(63) Continuation of application No. 18/198,673, filed on May 17, 2023, now Pat. No. 12,020,206, which is a (Continued)

(51) Int. Cl.
*G06Q 10/087* (2023.01)
*G06F 16/904* (2019.01)
*G06T 19/00* (2011.01)

(52) U.S. Cl.
CPC ......... *G06Q 10/087* (2013.01); *G06F 16/904* (2019.01); *G06T 19/006* (2013.01)

(58) Field of Classification Search
CPC ...... G06Q 10/087; G06Q 10/06; G06Q 30/02; G06Q 10/06315
See application file for complete search history.

(56) References Cited

U.S. PATENT DOCUMENTS

| | | | |
|---|---|---|---|
| 9,395,875 B2 | 7/2016 | Geraci | |
| 9,916,693 B1 * | 3/2018 | Carr | G06T 11/26 |

(Continued)

OTHER PUBLICATIONS

Information Visualization Cyberinfrastructure ("Force Directed Placement Algorithm", Jan. 2004) (Year: 2004).*

(Continued)

*Primary Examiner* — Florian M Zeender
*Assistant Examiner* — Vanessa Deligi
(74) *Attorney, Agent, or Firm* — Spencer Fane LLP; Steven J. Laureanti

(57) ABSTRACT

A system and method are disclosed for a mixed-reality visualization system having a computer configured to render a mixed-reality three-dimensional surface, identify one or more current demand regions, identify one or more potential demand regions; map the one or more current demand regions and the one or more potential demand regions on the rendered three-dimensional surface, model a free body coupled with demand centers of each of the one or more demand regions and each of the one or more potential demand regions using a spring model, calculate a location on the rendered three-dimensional surface representing an equilibrium position between the demand centers of the one or more demand regions and the one or more potential demand regions using the spring model, and render, for display on a rendering device, a visual indicator within the area corresponding to the location of the calculated equilibrium position.

20 Claims, 11 Drawing Sheets

Related U.S. Application Data continuation of application No. 16/720,354, filed on Dec. 19, 2019, now Pat. No. 11,783,289.

(60) Provisional application No. 62/816,399, filed on Mar. 11, 2019.

(56) References Cited

U.S. PATENT DOCUMENTS

| | | | |
|---|---|---|---|
| 10,347,401 B2 | 7/2019 | Gibson | |
| 10,817,889 B2 * | 10/2020 | Zachariah | G06Q 30/0639 |
| 10,852,838 B2 | 12/2020 | Bradski et al. | |
| 10,949,069 B2 | 3/2021 | Fang | |
| 11,285,382 B2 | 3/2022 | Liu et al. | |
| 11,312,392 B2 | 4/2022 | Katardjiev et al. | |
| 2009/0076888 A1 * | 3/2009 | Oster | G06Q 10/10 |
| | | | 705/7.34 |
| 2012/0127302 A1 * | 5/2012 | Imai | H04N 1/00323 |
| | | | 348/135 |
| 2012/0284083 A1 * | 11/2012 | Wu | G06Q 10/08 |
| | | | 705/7.31 |
| 2014/0006966 A1 * | 1/2014 | Geraci | G06Q 30/02 |
| | | | 345/633 |
| 2016/0078399 A1 * | 3/2016 | Gadre | G06Q 10/087 |
| | | | 705/28 |
| 2018/0240574 A1 * | 8/2018 | Gibson | B61B 7/02 |
| 2018/0332420 A1 * | 11/2018 | Salume | H04S 3/002 |
| 2019/0094981 A1 * | 3/2019 | Bradski | G06V 40/168 |
| 2019/0139310 A1 * | 5/2019 | Holzer | G06V 20/20 |
| 2019/0180300 A1 * | 6/2019 | Weston | G06F 16/29 |
| 2019/0266742 A1 * | 8/2019 | Peterson | H04L 67/131 |
| 2020/0255026 A1 * | 8/2020 | Katardjiev | G08G 1/096741 |
| 2020/0272308 A1 * | 8/2020 | Fang | G06F 3/04815 |
| 2021/0065226 A1 * | 3/2021 | Zachariah | G06F 16/29 |
| 2021/0129018 A1 * | 5/2021 | Liu | A63F 13/30 |

OTHER PUBLICATIONS

Skupin, "Spatialization Methods: A Cartographic Research Agenda for Non geographic Information Visualization", Apr. 2003 (Year: 2003).*

Visualization Cyberinfrastructure ("Force Directed Placement Algorithm", Jan. 2004) (Year: 2004).

Skupin, André, "Spatialization Methods: A Cartographic Research Agenda for Non-geographic Information Visualization", Apr. 2003 (Year: 2003).

* cited by examiner

300

302 — IDENTIFY THE PHYSICAL SURFACE

304 — IDENTIFY CURRENT DEMAND REGIONS

306 — IDENTIFY POTENTIAL DEMAND REGIONS

308 — PUT DEMAND REGIONS (DR) ON SURFACE

310 — CREATE FREE BODY AND CONNECT TO ALL DR BY SPRINGS

312 — FOR EVERY DR SPRING, SET SPRING CONSTANT = DEMAND

314 — SET NEUTRAL INITIAL POSITION

316 — FINAL EQUILIBRIUM = DESIRED LOCATION OF DISTRIBUTION CENTER

800

IMMERSIVE SUPPLY CHAIN ANALYTICS USING MIXED REALITY

CROSS-REFERENCE TO RELATED APPLICATIONS

This application is a continuation of U.S. patent application Ser. No. 18/198,673, filed May 17, 2023, entitled "Immersive Supply Chain Analytics Using Mixed Reality," which is a continuation of U.S. patent application Ser. No. 16/720,354, filed Dec. 19, 2019, entitled "Immersive Supply Chain Analytics Using Mixed Reality," now U.S. Pat. No. 11,783,289, which claims the benefit under 35 U.S.C. § 119(e) to U.S. Provisional Application No. 62/816,399, filed Mar. 11, 2019, entitled "Immersive Supply Chain Analytics using Mixed Reality." U.S. patent application Ser. No. 18/198,673, U.S. Pat. No. 11,783,289, and U.S. Provisional Application No. 62/816,399 are assigned to the assignee of the present application.

TECHNICAL FIELD

The present disclosure relates generally to supply chain planning and specifically to greenfield location using a mixed-reality user interface.

BACKGROUND

Modern supply chains are complex interconnected systems operating across continents or around the world. Achieving the best supply chain performance requires planning the optimized usage of resources, materials, and assets as well as adjusting the usage to respond in real-time to events that change or disrupt the plan. Supply chain analytics and real-time supply chain data are used to provide the insight necessary to generate plans and adjustments that are precise, accurate, and timely. However, creating a useful, and easy-to-understand visualization of supply chain networks with interactive resources, materials, and assets has proven difficult due to the intercontinental and global distribution of supply chain networks as well as the local, regional, and global effects of demographics, climate, and geography of real-world locations. The inability to interact with supply chain resources, materials, and assets in real time in connection with a visualization of demographics, climate, and geography of real-world locations is undesirable.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

DETAILED DESCRIPTION

Figure 1:
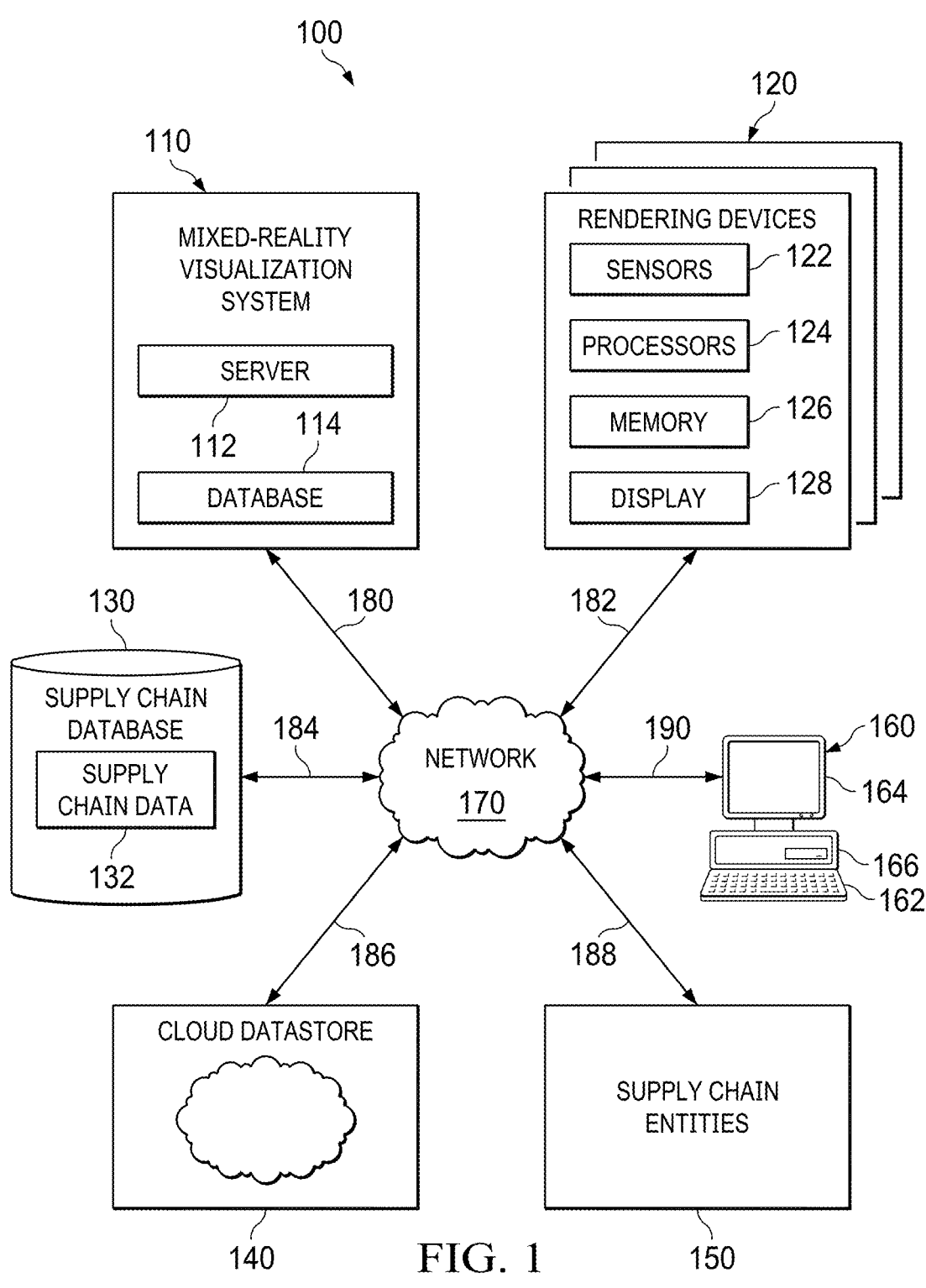
FIG. 1 illustrates a supply chain network, in accordance with a first embodiment.

Aspects and applications of the invention presented herein are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

FIG. 1 illustrates supply chain network 100, in accordance with a first embodiment. Supply chain network 100 comprises mixed-reality visualization system 110, one or more rendering devices 120, supply chain database 130, cloud datastore 140, one or more supply chain entities 150, computer 160, network 170, and communication links 180-190. Although a single mixed-reality visualization system 110, one or more rendering devices 120, a single supply chain database 130, a single cloud datastore 140, one or more supply chain entities 150, a single computer 160, and a single network 170 are shown and described, embodiments contemplate any number of mixed-reality visualization systems, any number of rendering devices, any number of supply chain entities, any number of supply chain databases, any number of cloud datastores, any number of computers, or any number of networks, according to particular needs.

Mixed-reality visualization system 110 comprises server 112 and database 114. As described in more detail below, server 112 of mixed-reality visualization system 110 comprises one or more modules that generate a mixed-reality environment having an interactive three-dimensional visualization for supply chain management (including strategic planning and master planning), physicalization of supply chain planning problems, identifying and solving supply chain problems, viewing key process indicators (KPIs) and other supply chain metrics and parameters, navigation of a global supply chain network, and greenfield siting or relocation of warehouse and manufacturing facilities. Embodiments of the following mixed-reality visualization system 110 interface with one or more rendering devices 120 to process, render, and display the mixed-reality environment and representations of supply chain network 100. According to further embodiments, mixed-reality visualization system 110 and one or more rendering devices 120 generate a visualization of, among other things, supply and demand, distribution networks, supply chain analytics, supply chain alerts, and KPIs, which may be conveyed to the user via one or more rendering devices 120 using visual and/or aural indicators. Mixed-reality visualization system 110 receives and processes data from one or more rendering devices 120, supply chain database 130, cloud datastore 140, and/or one or more supply chain entities 150 and stores the data in database 114.

Figure 2:
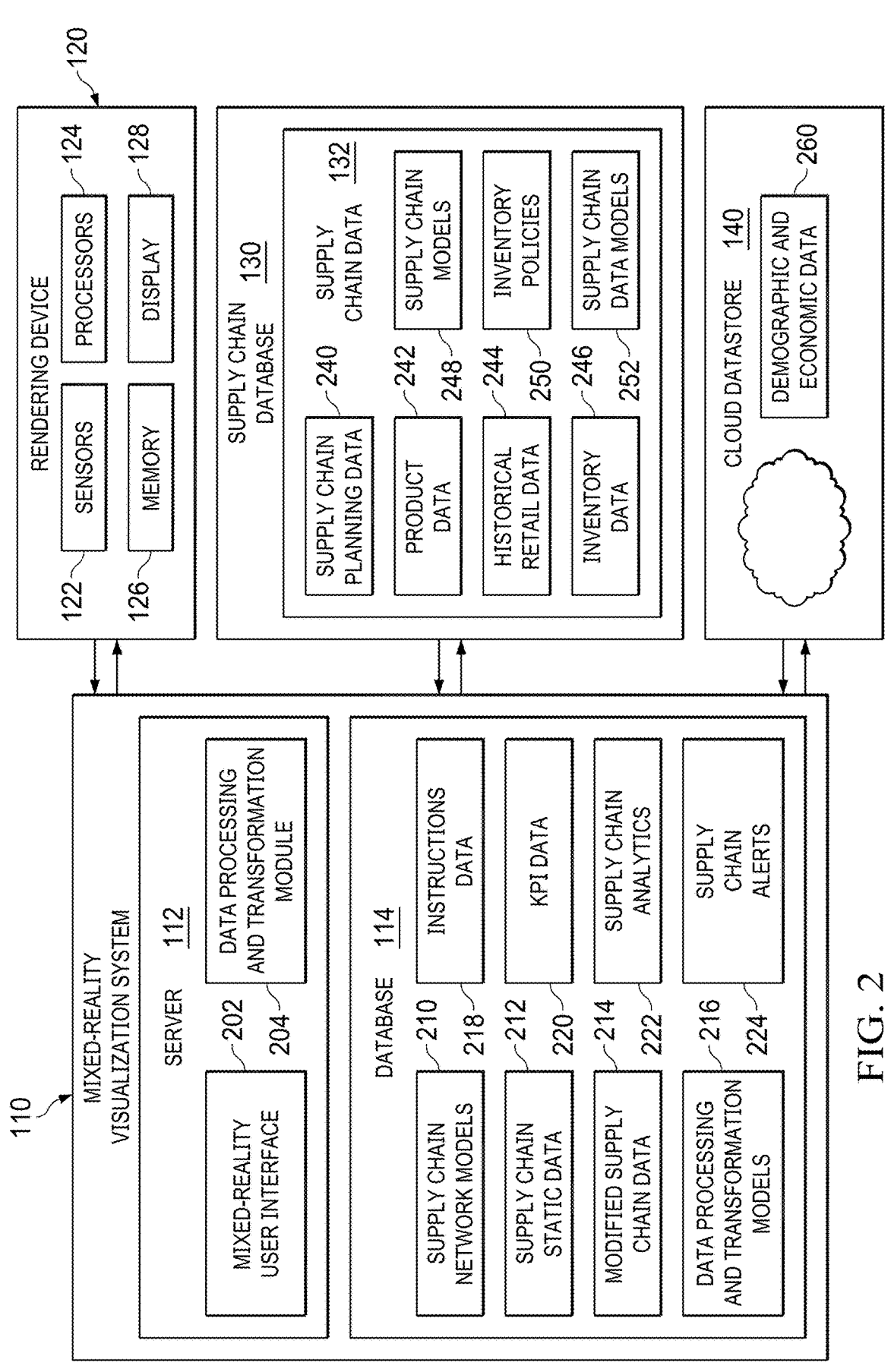
FIG. 2 illustrates the mixed-reality visualization system, the one or more rendering devices, the supply chain database, and the cloud datastore of FIG. 1 in greater detail, in accordance with an embodiment.

According to embodiments, one or more rendering devices 120 comprise one or more electronic devices that display mixed-reality visualizations for navigating and interacting with supply chain network 100 and supply chain analytics 222 (see FIG. 2). One or more rendering devices 120 may comprise, for example, a mixed-reality headset, a head-mounted display, a smartphone, a tablet computer, a mobile device, a projector, or like devices. One or more rendering devices 120 comprise one or more sensors 122, one or more processors 124, memory 126, display 128, and may include an input device, output device, and a fixed or removable computer-readable storage media. One or more sensors 122 may comprise an imaging sensor, such as, for example, a camera module, a LIDAR device, radar device, infrared light sensor, ambient light sensor, or other electronic sensor. According to one embodiments, one or more sensors 122 detect the head movement, the field of vision, and the gaze of a user of one or more rendering devices 120, as described in more detail below. One or more processors 124 and associated memory 126 execute instructions and manipulate information according to the operation of mixed-reality visualization system 110 and any of the methods described herein. Display 128 of one or more rendering devices 120 displays visual information, such as, for example, feedback, analysis, data, images or graphics using mixed-reality visualizations. For example, display 128 of one or more rendering devices 120 may superimpose graphics, colors, text, or other renderings of supply chain data 132 over or in connection with a virtual visualization of a globe or map. Using one or more rendering devices 120, a user may interact with the rendered visualizations using speech, eye movement, and spoken instructions to interact with and modify supply chain network 100. As described in more detail below, mixed-reality visualization system 110, in connection with one or more rendering devices 120, comprises a system to visualize supply chain processes and supply chain analytics 222 for improved real-time interaction. One or more rendering devices 120 may include fixed or removable computer-readable storage media, including a non-transitory computer readable medium, magnetic computer disks, flash drives, CD-ROM, in-memory device or other suitable media to receive output from and provide input to mixed-reality visualization system 110.

Supply chain database 130 stores supply chain data 132 received from one or more supply chain entities 150. Supply chain data 132 may comprise supply chain static data, such as facilities, warehouses, manufacturing lines, distribution lines, and the like, as well as supply chain constraints, planning parameters and optimization objectives. In one embodiment supply chain database 130 stores supply chain data 132 received from a manufacturing supply chain, such as, for example, data received from a demand planning system, inventory optimization system, supply planning system, order promising system, factory planning and sequencing system, and sales and operations planning system. In an embodiment where supply chain network 100 comprises a retail supply chain, supply chain database 130 stores data received from one or more retail supply chain planning and execution systems such as, for example, historical sales data, retail transaction data, store characteristic data, and data received from demand planning system, assortment optimization system, category management system, transportation management system, labor management system, and warehouse management system. Although particular planning and execution systems of particular types of supply chain network 100 are shown and described, embodiments contemplate supply chain database 130 storing data received from planning and execution systems for any type of supply chain network 100 and data received from one or more locations local to, or remote, from supply chain network 100, such as, for example, social media data, weather data, social trends, and the like.

Cloud datastore 140 receives and stores demographic and economic data 260 which is accessed by mixed-reality visualization system 110 and mapped to mixed-reality globe visualization 800 (see FIG. 8), as described in more detail below. Although cloud datastore 140 is shown and described as comprising demographic and economic data 260, embodiments contemplate cloud datastore 140 storing any type of data received from any one or more locations local to, or remote from, supply chain network 100.

Mixed-reality visualization system 110, one or more rendering devices 120, supply chain database 130, cloud datastore 140, and one or more supply chain entities 150 may operate on one or more computers 160 that are integral to or separate from the hardware and/or software that support that mixed-reality visualization system 110, one or more rendering devices 120, supply chain database 130, cloud datastore 140, and one or more supply chain entities 150. Computers 160 may include any suitable input device 162, such as a keypad, mouse, touch screen, joystick, navigation control device, microphone, or other device to input information to mixed-reality visualization system 110, one or more rendering devices 120, supply chain database 130, cloud datastore 140, one or more supply chain entities 150, and computer 160. Output device 164 may convey information associated with the operation of mixed-reality visualization system 110, including digital or analog data, visual information, or audio information such as, for example, one or more displays, speakers, and/or haptics. Computers 160 may include fixed or removable computer-readable storage media, including a non-transitory computer readable medium, magnetic computer disks, flash drives, CD-ROM, in-memory device or other suitable media to receive output from and provide input to mixed-reality visualization system 110. Computers 160 may include one or more processors 166 and associated memory to execute instructions and manipulate information according to the operation of mixed-reality visualization system 110 and any of the methods described herein. In addition, or as an alternative, embodiments contemplate executing the instructions on computers 160 that cause computers 160 to perform functions of the method. Further examples may also include articles of manufacture including tangible computer-readable media that have computer-readable instructions encoded thereon, and the instructions may comprise instructions to perform functions of the methods described herein.

Although a single computer is shown in FIG. 1, mixed-reality visualization system 110, one or more rendering devices 120, supply chain database 130, cloud datastore 140, and one or more supply chain entities 150 may each operate on separate computers 160 or may operate on one or more shared computers 160. Each of one or more computers 160 may be a work station, personal computer (PC), network computer, notebook computer, tablet, personal digital assistant (PDA), cell phone, telephone, wireless data port, mobile device, or any other suitable computing device. In an embodiment, one or more users may be associated with mixed-reality visualization system 110. These one or more users may include, for example, a "manager" or a "planner" handling inventory planning, packing, and/or shipping for items of one or more supply chain entities 150 based, at least in part, on altered parameters received from mixed-reality visualization system 110 in response to a user input and/or one or more related tasks within supply chain network 100. In addition, or as an alternative, these one or more users within supply chain network 100 may include, for example, one or more computers 160 programmed to autonomously handle, among other things, one or more supply chain processes such as demand planning, supply and distribution planning, inventory management, allocation planning, and/or order fulfilment.

In one embodiment, one or more supply chain entities 150 represent one or more supply chain networks, including, for example, one or more enterprises, and may comprise one or more suppliers, manufacturers, distribution centers, retailers, and/or customers. A supplier may be any suitable entity that offers to sell or otherwise provides one or more items (i.e., materials, components, or products) to one or more manufacturers. Items may comprise, for example, parts or supplies used to generate products. An item may comprise a part of the product, or an item may comprise a supply that is used to manufacture the product, but does not become a part of the product, for example, a tool, energy, or resource. According to some embodiments, items comprise foods or ingredients. According to other embodiments, items and products may each receive a Universal Product Code (UPC), RFID tag, or barcode that identifies (including uniquely identifying) the item or product. Such suppliers may comprise automated distribution systems that automatically transport products to one or more manufacturers based, at least in part, on one or more altered parameters received from mixed-reality visualization system 110 in response to a user input, such as, for example an instruction to increase capacity at one or more supply chain locations, altering demand or supply levels at one or more supply chain entities 150, siting a warehouse or distribution center for a potential demand region, or other interactions described herein.

A manufacturer may be any suitable entity that manufactures at least one product. A manufacturer may use one or more items during the manufacturing process to produce any manufactured, fabricated, assembled, or otherwise processed item, material, component, good or product. In one embodiment, a product represents an item ready to be supplied to, for example, another supply chain entity, such as a supplier, an item that needs further processing, or any other item. A manufacturer may, for example, produce and sell a product to a supplier, another manufacturer, a distribution center, a retailer, a customer, or any other suitable entity. Such manufacturers may comprise automated robotic production machinery that produce products based, at least in part, on one or more altered parameters received from mixed-reality visualization system 110 in response to a user input, such as, for example an instruction to increase capacity at one or more supply chain locations, altering demand or supply levels at one or more supply chain entities 150, siting a warehouse or distribution center for a potential demand region, or other interactions described herein.

A distribution center may be any suitable entity that offers to store or otherwise distributes at least one product to one or more retailers and/or customers. A distribution center may, for example, receive a product from another entity in supply chain network 100 and store and transport the product for another supply chain entity. Such distribution centers may comprise automated warehousing systems that automatically remove products from and place products into inventory based, at least in part, on one or more altered parameters received from mixed-reality visualization system 110 in response to a user input, such as, for example an instruction to increase capacity at one or more supply chain locations, altering demand or supply levels at one or more supply chain entities 150, siting a warehouse or distribution center for a potential demand region, or other interactions described herein.

One or more retailers may be any suitable entity that obtains one or more products to sell to one or more customers. In addition, one or more retailers may sell, store, and supply one or more components and/or repair a product with one or more components. One or more retailers may comprise any online or brick and mortar location, including locations with shelving systems. Shelving systems may comprise, for example, various racks, fixtures, brackets, notches, grooves, slots, or other attachment devices for fixing shelves in various configurations. These configurations may comprise shelving with adjustable lengths, heights, and other arrangements, which may be adjusted by an employee of one or more retailers based on computer-generated instructions or automatically by machinery to place products in a desired location.

Although one or more supply chain entities 150 are shown and described as separate and distinct entities, the same entity may simultaneously act as any other of one or more supply chain entities 150. For example, one or more supply chain entities 150 acting as a manufacturer can produce a product, and the same entity can act as a supplier to supply an item to itself or another supply chain entity. Although one example of supply chain network 100 is shown and described, embodiments contemplate any suitable supply chain network, according to particular needs.

In one embodiment, mixed-reality visualization system 110 is coupled with network 170 using communications link 180, which may be any wireline, wireless, or other link suitable to support data communications between mixed-reality visualization system 110 and network 170 during operation of supply chain network 100. One or more rendering devices 120 are coupled with network 170 using communications link 182, which may be any wireline, wireless, or other link suitable to support data communications between one or more rendering devices 120 and network 170 during operation of supply chain network 100. Supply chain database 130 is coupled with network 170 using communications link 184, which may be any wireline, wireless, or other link suitable to support data communications between supply chain database 130 and network 170 during operation of supply chain network 100. Cloud datastore 140 is coupled with network 170 using communications link 186, which may be any wireline, wireless, or other link suitable to support data communications between cloud datastore 140 and network 170 during operation of supply chain network 100. One or more supply chain entities 150 are coupled with network 170 using communications link 188, which may be any wireline, wireless, or other link suitable to support data communications between one or more supply chain entities 150 and network 170 during operation of supply chain network 100. Computer 160 is coupled with network 170 using communications link 190, which may be any wireline, wireless, or other link suitable to support data communications between computer 160 and network 170 during operation of supply chain network 100. Although the communication links are shown as generally coupling mixed-reality visualization system 110, one or more rendering devices 120, supply chain database 130, cloud datastore 140, one or more supply chain entities 150, and computer 160 with network 170, mixed-reality visualization system 110, one or more rendering devices 120, one or more supply chain databases 130, one or more cloud datastores 140, one or more supply chain entities 150, and computers 160 may communicate directly with mixed-reality visualization system 110, one or more rendering devices 120, supply chain database 130, cloud datastore 140, one or more supply chain entities 150, and computer 160, according to particular needs.

In another embodiment, network 170 includes the Internet and any appropriate local area networks (LANs), metropolitan area networks (MANs), or wide area networks (WANs) coupling mixed-reality visualization system 110, one or more rendering devices 120, supply chain database 130, cloud datastore 140, one or more supply chain entities 150, and computers 160. For example, data may be maintained by mixed-reality visualization system 110 at one or more locations external to mixed-reality visualization system 110, one or more rendering devices 120, supply chain database 130, cloud datastore 140, one or more supply chain entities 150, and computers 160 and made available to one or more associated users of mixed-reality visualization system 110, one or more rendering devices 120, supply chain database 130, cloud datastore 140, one or more supply chain entities 150, and computers 160 using network 170 or in any other appropriate manner. Those skilled in the art will recognize that the complete structure and operation of the communication network and other components within supply chain network 100 are not depicted or described. Embodiments may be employed in conjunction with known communications networks and other components.

In accordance with the principles of embodiments described herein, mixed-reality visualization system 110 may generate an inventory plan, packing plan, or shipping plan for the items of one or more supply chain entities 150 in supply chain network 100 based, at least in part, on an altered parameters received from mixed-reality visualization system 110 in response to a user input, such as, for example an instruction to increase capacity at one or more supply chain locations, altering demand or supply levels at one or more supply chain entities 150, siting a warehouse or distribution center for a potential demand region, or other interactions described herein. Furthermore, mixed-reality visualization system 110 may instruct automated machinery (i.e., robotic warehouse systems, robotic inventory systems, automated guided vehicles, mobile racking units, automated robotic production machinery, robotic devices and the like) to adjust product mix ratios, inventory levels at various stocking points, production of products of manufacturing equipment, proportional or alternative sourcing of one or more supply chain entities 150, and the configuration and quantity of packaging and shipping of items based on one or more generated inventory plans, packing plans, or shipping plans and/or current inventory or production levels. For example, the methods described herein may include computers 160 receiving product data 242 from automated machinery having at least one sensor 122 and product data 242 corresponding to an item detected by the automated machinery. Received product data 242 may include an image of the item, an identifier, as described above, and/or other product data 242 associated with the item (dimensions, texture, estimated weight, and any other like data). The method may further include computers 160 looking up received product data 242 in a database system associated with mixed-reality visualization system 110 to identify the item corresponding to product data 242 received from the automated machinery.

Computers 160 may also receive, from the automated machinery, a current location of the identified item. Based on the identification of the item, computers 160 may also identify (or alternatively generate) a first mapping in the database system, where the first mapping is associated with the current location of the identified item. Computers 160 may also identify a second mapping in the database system, where the second mapping is associated with a past location of the identified item. Computers 160 may also compare the first mapping and the second mapping to determine if the current location of the identified item in the first mapping is different than the past location of the identified item in the second mapping. Computers 160 may then send instructions to one or more rendering devices 120 or automated machinery based, as least in part, on one or more differences between the first mapping and the second mapping such as, for example, to locate items to add to or remove from an inventory, container, or package for one or more supply chain entities 150.

According to these embodiments, and as discussed in more detail below, mixed-reality visualization system 110 may determine a difference between current inventory levels and the inventory reorder points for one or more items in an inventory. Based on the difference, mixed-reality visualization system 110 may instruct the automated machinery to add items to a shipment in an amount equal to the inventory target quantities minus the difference between current inventory levels and the inventory reorder points. For example, mixed-reality visualization system 110 may determine an inventory plan, packing plan, or shipping plan based on forecasted demand, current inventory levels, forecasted production levels, item attributes, pack constraints, store constraints, and the like. Based on these factors and constraints, mixed-reality visualization system 110 generates instructions, feedback, and a visualization of supply chain network 100 via one or more rendering devices 120.

FIG. 2 illustrates mixed-reality visualization system 110, one or more rendering devices 120, supply chain database 130, and cloud datastore 140 of FIG. 1 in greater detail, in accordance with an embodiment. As discussed above, mixed-reality visualization system 110 comprises server 112 and database 114. Although mixed-reality visualization system 110 is shown as comprising a single server 112 and a single database 114, embodiments contemplate any number of servers or databases internal to, or externally coupled with, mixed-reality visualization system 110, according to particular needs.

Database 114 of mixed-reality visualization system 110 comprises supply chain network models 210, supply chain static data 212, modified supply chain data 214, data processing and transformation models 216, instructions data 218, KPI data 220, supply chain analytics 222, and supply chain alerts 224. Although database 114 is shown and described as comprising supply chain network models 210, supply chain static data 212, modified supply chain data 214, data processing and transformation models 216, instructions data 218, KPI data 220, supply chain analytics 222, and supply chain alerts 224, embodiments contemplate any number or combination of data stored at one or more locations local to, or remote from, mixed-reality visualization system 110, such as on multiple servers or computers 160 at any location in supply chain network 100.

According to embodiments, mixed-reality visualization system 110 uses the one or more supply chain network models 210 to display supply chain static data 212 by mixed-reality globe visualization 800. In addition, mixed-reality visualization system 110 utilizes one or more supply chain network models 210 to process modified supply chain data 214 generated by one or more rendering devices 120 in response to and based, at least in part, on one or more user interactions with mixed-reality user interface 202 such as, for example, physical, visual, and voice inputs and feedback, which may be stored as instructions data 218.

In addition, mixed-reality visualization system 110 uses one or more data processing and transformation models 216 (which may include, for example, one or more heuristic models) to generate KPIs (which may be stored as KPI data 220) for mapping to mixed-reality globe visualization 800 and to receive input and other instructions generated by one or more rendering devices 120, such as for example, one or more user interactions with mixed-reality user interface 202 such as, for example, physical, visual, and voice inputs and feedback, which may be stored as instructions data 218.

According to one embodiment, supply chain analytics 222 comprise input data, output data, and values of various objectives, which may be displayed at a detailed level or aggregated over one or more dimensions. Embodiments of the mixed-reality visualization system 110 contemplate supply chain analytics 222 comprising answers displayed by mixed-reality visualization system 110 in response to simple or complex queries. By way of example only and not by way of limitation, mixed-reality visualization system 110 may receive a query spoken by a user, such as, for example, "Show me the second most cost-effective facility that can help in increasing the demand satisfaction by ten percent." In response to the received query, mixed-reality visualization system 110 may alter the mixed-reality globe visualization 800 to display an indicator that locates the second most cost effective facility that will increase the demand satisfaction by at least ten percent.

According to embodiments, mixed-reality visualization system 110 provides for monitoring one or more supply chain processes, detecting an exception or problem condition (such as, for example, a KPI that is outside of a predetermined threshold), and generating one or more supply chain alerts 224. As described in more detail below, supply chain alerts 224 may comprise changing the color, size, or other properties of mapped features (such as, for example, one or more nodes of supply chain network 100) as well as any type of visual, auditory, or haptic cues.

Server 112 of mixed-reality visualization system 110 comprises mixed-reality user interface 202 and data processing and transformation module 204. Although server 112 is shown and described as comprising a single mixed-reality user interface 202 and a single data processing and transformation module 204, embodiments contemplate any suitable number or combination of mixed-reality user interfaces and data processing and transformation modules located at one or more locations, local to, or remote from mixed-reality visualization system 110, such as on multiple servers or computers at any location in supply chain network 100.

Mixed-reality user interface 202 generates mixed-reality globe visualization 800 comprising a navigable three-dimensional world globe displaying one or more nodes of supply chain network 100. As described in more detail herein, mixed-reality user interface 202 provides navigation (such as, for example, zooming in and out, rotation, internal or external viewing, and the like) with mixed-reality globe visualization 800 by receiving physical, visual, and voice input from one or more rendering devices 120. In addition, mixed-reality user interface 202 provides interactive displayed data of mixed-reality globe visualization 800 (such as, for example, modifiable geographical and political regions, nodes of supply chain network 100, supply chain metrics and parameters, and the like) by receiving input from one or more rendering devices 120.

As discussed in more detail below, mixed-reality user interface 202 models one or more supply chain planning problems (such as, for example, an inventory planning problem, a master planning problem, and the like), identifies resources, operations, buffers, and pathways, and maps supply chain network 100 using supply chain network models 210 and/or supply chain data models 252.

According to embodiments, data processing and transformation module 204 modifies supply chain data 132 in response to receiving input or instructions from one or more rendering devices 120. According to one embodiment, data processing and transformation module 204 generates a solution to the supply chain planning problem mapped to the mixed-reality globe visualization based, at least in part, on input and instructions received from one or more rendering devices 120. As described below, mixed-reality visualization system 110 generates KPIs and other data outputs for display on mixed-reality globe visualization 800 using one or more data transformation processes and models 212.

One or more rendering devices 120 comprises sensors 122, processors 124, memory 126, and display 128, as described above. According to one embodiment, one or more rendering devices 120 comprise sensors 122 comprising a gaze tracking sensor, hand gesture sensor, and head orientation sensor. According to other embodiments, one or more rendering devices 120 provides a spatial visualization of a mixed-reality globe visualization providing for viewing, hearing, and/or receiving haptics conveying supply chain data 132, KPI data 220, supply chain analytics 222, feedback, and other data through a device such as a mixed-reality headset (for example, the MICROSOFT HOLO-LENS, META 2 or EPSON MOVERIO BT-200 mixed-reality headsets). According to embodiments, one or more rendering devices 120 may receive one or more user inputs for search, navigation, visualization, and supply chain action. Embodiments contemplate a mixed-reality headset that provides user input by one or more of voice tracking, gaze tracking, hand gesture tracking, and incremental discovery (i.e. looking in a direction to discover the related supply chain components). Additionally, one or more sensors 122 of one or more rendering devices 120 may be located at one or more locations local to, or remote from, one or more rendering devices 120, including, for example, one or more sensors 122 integrated into one or more rendering devices 120 or one or more sensors 122 remotely located from, but communicatively coupled with, one or more rendering devices 120. As stated above, one or more rendering devices 120 may include one or more processors 124 and associated memory 126 to execute instructions and manipulate information according to the operation of mixed-reality visualization system 110 and any of the methods described herein.

For example, mixed-reality user interface 202 may be navigated by speaking a command (such as, for example, "show me the location with the highest shortage" or other like command), by gazing or staring at a particular supply chain network component (such as, for example, staring at a location causes mixed-reality visualization system 110 to alter the color of a visual element to illustrate the amount of demand satisfaction at a node at, or near to, the location), and/or by using tracked movements of a hand, finger, or arm of a user (such as, for example, tapping on a mixed-reality surface displayed by one or more rendering devices 120 such as, for example, a graphic representing an end item, causes mixed-reality visualization system 110 to render and/or display a graphic representing the raw-material that is consumed by production of the end item).

Display 128 of one or more rendering devices 120 may comprise for example, a projector, a monitor, an LCD panel, or any other suitable electronic display device. Embodiments contemplate one or more rendering devices 120 having more than one display 128, including a first display configured to direct an image into a user's left eye (a left eye display) and a second display configured to direct an image into a user's right eye (a right eye display) to provide a mixed-reality visualization by, for example, displaying visual elements on a transparent or translucent medium directly in front of a user's eyes, so that the visual element appears within the visual field of the user. One or more rendering devices 120 display visual elements overlaid on real-world scenes and located based, at least in part, on the calculated visual field of the user. According to embodiments, information may be projected, overlaid, superimposed, or displayed such that the rendered and displayed images, text, and graphics are fixed in a virtual three-dimensional space anchored with a point or object in the environment, in a virtual space, or an orientation of the user or of one or more rendering devices 120. In addition, or as an alternative, display 128 may display a mixed-reality visualization on an opaque display by overlaying one or more visual elements over a visual feed from a camera, and altering the appearance and placement of the visual elements based, at least in part, on the movement of objects within the visual feed of the camera and/or one or more sensors 122.

According to some embodiments, mixed-reality visualization system 110 arranges visual indicators representing one or more supply chain entities 150 on the inner or outer surface of mixed-reality globe visualization 800 based, at least in part, on the field of view of display 128 of one or more rendering devices 120. In addition, mixed-reality visualization system 110 alters feedback based on a geographical position of supply chain entities 150 to use one or more of audio feedback, audio-visual feedback, synthesis of audio feedback based on the value of supply chain KPIs (such as, for example, pleasant sound if a KPI is favorable, or a shrill or unpleasant sound if KPI is adverse). When one or more supply chain entities 150 are displayed on an inner surface of a hollow sphere with the user inside of the globe, the audio and/or audio-visual feedback may be used to locate one or more supply chain entities 150 using sound localization by associating an aural indicator plotted in three-dimensional space with one or more supply chain entities 150.

As stated above, mixed-reality visualization system 110 communicates with one or more external database storage systems such as, for example, supply chain database 130, cloud datastore 140, or one or more other data storage systems local to, or remote from, supply chain network 100. Supply chain database 130 may comprise one or more databases or other data storage arrangement at one or more locations, local to, or remote from, supply chain network 100. Supply chain database 130 comprises supply chain data 132 including, by way of example only and not of limitation, supply chain planning data 240, product data 242, historical retail data 244, inventory data 246, supply chain models 248, inventory policies 250, and supply chain data models 252. Although, supply chain database 130 is shown and described as comprising supply chain planning data 240, product data 242, historical retail data 244, inventory data 246, supply chain models 248, inventory policies 250, and supply chain data models 252, embodiments contemplate any suitable number or combination of these, located at one or more locations, local to, or remote from, supply chain database 130, according to particular needs.

As an example only and not by way of limitation, supply chain database 130 stores supply chain planning data 240, including one or more supply chain planning problems of supply chain network 100 that may be used by mixed-reality visualization system 110. Supply chain planning data 240 may comprise for example, various decision variables, business constraints, goals, and objectives of one or more supply chain entities 150. According to some embodiments, supply chain planning data 240 may comprise hierarchical objectives specified by, for example, business rules, master planning requirements, scheduling constraints, and discrete constraints, including, for example, sequence dependent setup times, lot-sizing, storage, shelf life, and the like.

Product data 242 of supply chain database 130 may comprise one or more data structures for identifying, classifying, and storing data associated with products, including, for example, a product identifier (such as a Stock Keeping Unit (SKU), Universal Product Code (UPC), or the like), product attributes and attribute values, sourcing information, and the like. Product data 242 may comprise data about one or more products organized and sortable by, for example, product attributes, attribute values, product identification, sales quantity, demand forecast, or any stored category or dimension. Attributes of one or more products may be, for example, any categorical characteristic or quality of a product, and an attribute value may be a specific value or identity for the one or more products according to the categorical characteristic or quality, including, for example, physical parameters (such as, for example, size, weight, dimensions, fill level, color, and the like).

Historical retail data 244 of supply chain database 130 may comprise, for example, any data relating to past sales, past demand, purchase data, promotions, events, or the like of one or more supply chain entities 150. Historical retail data 244 may cover a time interval such as, for example, by the minute, hourly, daily, weekly, monthly, quarterly, yearly, or any suitable time interval, including substantially in real time. According to embodiments, historical retail data 244 may include historical demand and sales data or projected demand forecasts for one or more retail locations, customers, regions, or the like of one or more supply chain entities 150 and may include historical or forecast demand and sales segmented according to product attributes, customers, regions, or the like.

Inventory data 246 of supply chain database 130 may comprise any data relating to current or projected inventory quantities or states, order rules, or the like. For example, inventory data 246 may comprise the current level of inventory for each item at one or more stocking locations across supply chain network 100. In addition, inventory data

246 may comprise order rules that describe one or more rules or limits on setting an inventory policy, including, but not limited to, a minimum order quantity, a maximum order quantity, a discount, a step-size order quantity, and batch quantity rules. According to some embodiments, mixed-reality visualization system 110 accesses and stores inventory data 246 in supply chain database 130, which may be used by one or more planning and execution systems of one or more supply chain entities 150 to place orders, set inventory levels at one or more stocking points, initiate manufacturing of one or more items (or components of one or more items), or the like. In addition, or as an alternative, inventory data 246 may be updated by receiving current item quantities, mappings, or locations from an inventory system, a transportation network, one or more rendering devices 120, and/or one or more supply chain entities 150.

Supply chain models 248 of supply chain database 130 may comprise characteristics of a supply chain setup to deliver the customer expectations of a particular customer business model. These characteristics may comprise differentiating factors, such as, for example, MTO (Make-to-Order), ETO (Engineer-to-Order) or MTS (Make-to-Stock). However, supply chain models 248 may also comprise characteristics that specify the structure of supply chain network 100 in even more detail, including, for example, specifying the type of collaboration with the customer (e.g. Vendor-Managed Inventory (VMI)), from which stocking locations or suppliers items may be sourced, customer priorities, demand priorities, how products may be allocated, shipped, or paid for, by particular customers, and the destination stocking locations or one or more supply chain entities 150 where items may be transported. Each of these characteristics may lead to a different supply chain model of supply chain models 248.

Inventory policies 250 of supply chain database 130 may comprise any suitable inventory policy describing the reorder point and target quantity, or other inventory policy parameters that set rules for one or more planning and execution systems of one or more supply chain entities 150 to manage and reorder inventory. Inventory policies 250 may be based on target service level, demand, cost, fill rate, or the like. According to embodiments, inventory policies 250 may be used by mixed-reality visualization system 110 to determine a no-stockout probability, fill rate, cost, or other like determination of KPI targets, as described below. According to embodiment, inventory policies 250 comprise target service levels that ensure that a service level of one or more supply chain entities 150 is met with a certain probability. For example, one or more supply chain entities 150 may set a target service level at 95%, meaning one or more supply chain entities 150 will set the desired inventory stock level at a level that meets demand 95% of the time. Although a particular target service level and percentage is described, embodiments contemplate any target service level, for example, a target service level of approximately 99% through 90%, 75%, or any target service level, according to particular needs. Other types of service levels associated with inventory quantity or order quantity may comprise, but are not limited to, a maximum expected backlog and a fulfillment level. Once the service level is set, one or more planning and execution systems of one or more supply chain entities 150 may determine a replenishment order according to one or more replenishment rules, which, among other things, indicates to one or more supply chain entities 150 to determine or receive inventory to replace the depleted inventory.

Supply chain data models 252 represent the flow of materials through one or more supply chain entities 150 of supply chain network 100. Mixed-reality user interface 202 may model the flow of materials through one or more supply chain entities 150 of supply chain network 100 as one or more supply chain data models 252 comprising a network of nodes and edges. The material storage and/or transition units are modelled as nodes, which may be referred to as, for example, buffer nodes, buffers, or nodes. Each node may represent a buffer for an item (such as, for example, a raw material, intermediate good, finished good, component, and the like), resource, or operation (including, for example, a production operation, assembly operation, transportation operation, and the like). Various transportation or manufacturing processes are modelled as edges connecting the nodes. Each edge may represent the flow, transportation, or assembly of materials (such as items or resources) between the nodes by, for example, production processing or transportation. A planning horizon for supply chain data models 252 may be broken down into elementary time-units, such as, for example, time-buckets, or, simply, buckets. The edge between two buffer nodes may denote processing of material and the edge between different buckets for the same buffer may indicate inventory carried forward. Flow-balance constraints for most, if not every buffer in every bucket, model the material movement in supply chain network 100.

Cloud datastore 140 comprises demographic and economic data 260. Demographic and economic data 260 may be maintained in cloud datastore 140 at one or more locations external to mixed-reality visualization system 110 or one or more rendering devices 120 and made available to one or more associated users of mixed-reality visualization system 110 and one or more rendering devices 120 using the cloud or in any other appropriate manner. Demographic and economic data 260 includes, for example, population data, population density, spending potential, per capita disposable income, and the like. Although cloud datastore 140 is shown as comprising demographic and economic data 260, embodiments contemplate any suitable number of this or other data, internal to, or externally coupled with, cloud datastore 140.

According to embodiments, mixed-reality visualization system 110 utilizes demographic and economic data 260 to site the location of a new warehouse or distribution center using a spring model.

Figure 3:
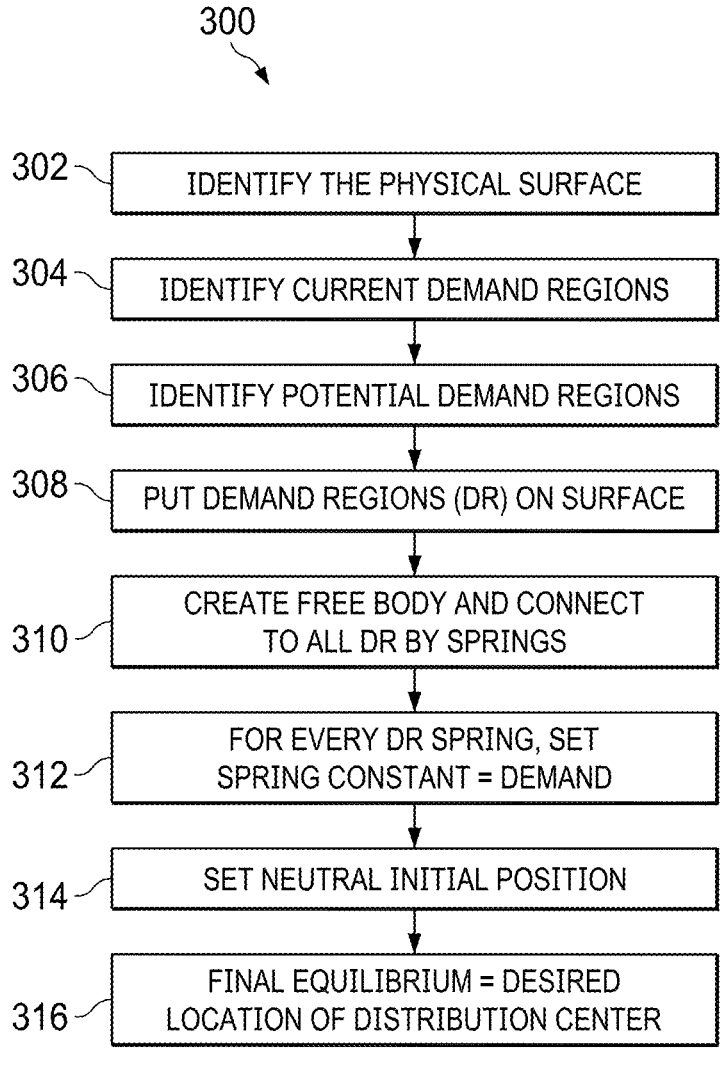
FIG. 3 illustrates a method of siting a location of the one or more supply chain entities of FIG. 1, in accordance with an embodiment.

FIG. 3 illustrates method 300 of siting a location of one or more supply chain entities 150 of FIG. 1, in accordance with an embodiment. Method 300 of siting a location of one or more supply chain entities 150 proceeds by one or more activities, which although described in a particular order may be performed in one or more permutations, according to particular needs.

At activity 302, the mixed-reality visualization system identifies the physical surface of a globe, map, or other representation of the world or a region of the world comprising supply chain network 100. According to embodiments, mixed-reality visualization system 110 creates mixed-reality globe visualization 800 comprising a three-dimensional mixed-reality globe that is displayed in front of the user using one or more rendering devices 120, as described in further detail below. Embodiments contemplate modeling one or more physical or geographic features such as hills, mountains, roads, rivers, or the like on a three-dimensional or other representational model providing for display, navigation, and interaction of supply chain network 100 and/or supply chain network models 210.

At activity 304, mixed-reality visualization system 110 identifies current demand regions. According to one embodiment, mixed-reality visualization system 110 identifies one or more demand regions, such as, for example, a political, geographic, census, or other subunit of a geographic area, whose demand for a particular product or service is tracked by one or more supply chain entities 150. In addition, the demand regions may already be present in a system of records, and the demand associated with the demand regions may be met through supply chain activities. A demand region may be, for example, a continent, country, region, state, metropolitan area, city, neighborhood, or the like.

At activity 306, mixed-reality visualization system 110 identifies potential demand regions. According to embodiments, potential demand regions comprise a geographical region, such as, for example, a political, geographic, census, or other subunit of a geographic area, whose demand for a particular product or service is considered to be met though an existing or augmented supply chain. For example, mixed-reality visualization system 110 may identify and present one or more potential demand regions as a list, in descending order, of current demand to identify a market to serve represented by the potential demand region.

At activity 308, mixed-reality visualization system 110 maps one or more demand regions and/or potential demand regions on mixed-reality globe visualization 800 of one or more rendering devices 120. According to embodiments, mixed-reality visualization system 110 displays the demand region by placing a visual indicator in a demand center or locational center of the demand region. By way of example only and not by way of limitation, when the demand region comprises a state, visual indicator may be placed within the demand or geographic center of the state. Continuing with this example, mixed-reality visualization system 110 selects the demand region comprising a state in response to detecting a gaze of a user on this state displayed on mixed-reality visualization 800. Mixed-reality visualization system 110 displays the visual indicator the selected demand regions using an indicator, such as, for example, a boundary of the city, state, or country of the associated with the demand region. Embodiments contemplate accessing data associated with the demand region, such as, for example, economic indicators, costs to build a facility for one or more supply chain entities 150, population, per capita or total spending, real estate costs, and the like.

Figures 4, 5, 6:
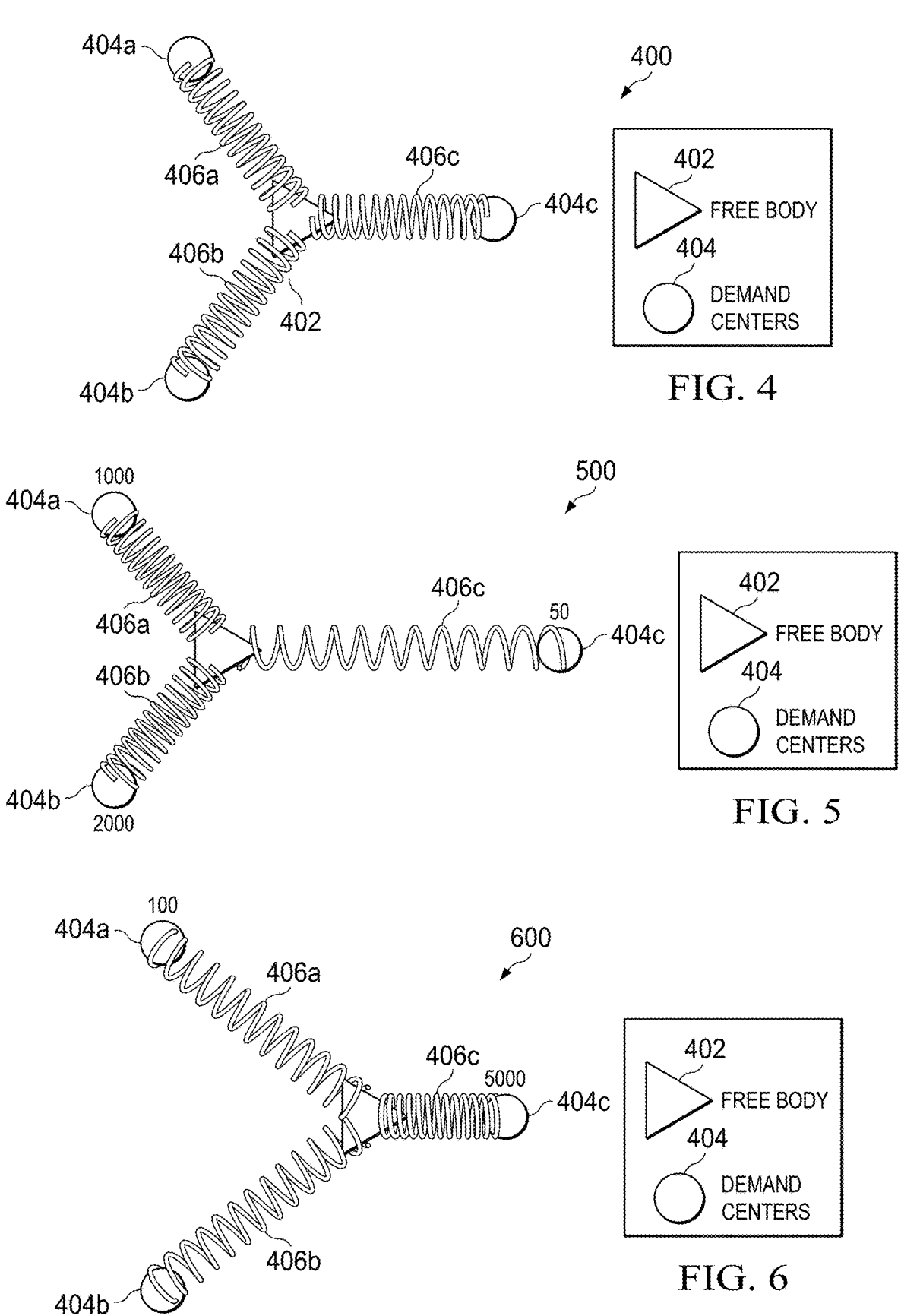
FIG. 4 illustrates a diagram of the spring model of the mixed-reality visualization system of FIG. 1, in accordance with an embodiment.
FIG. 5 illustrates a first exemplary scenario comprising the demand centers of three demand regions, in accordance with an embodiment.
FIG. 6 illustrates a second exemplary scenario comprising the demand centers of three demand regions, in accordance with an embodiment.

FIG. 4 illustrates diagram 400 of the spring model of mixed-reality visualization system 110 of FIG. 1, in accordance with an embodiment. Diagram 400 of the spring model comprises free body 402 coupled to demand centers 404a-404c by springs 406a-406c.

Returning to method 300, at activity 310, mixed-reality visualization system 110 creates free body 402 and couples free body 402 to each demand region using the spring model. By way of example only and not by way of limitation, mixed-reality visualization system 110 models location of a distribution center as free body 402 connected to the markets identified to be served as demand regions, each region comprising one or more demand centers 404a-404c centered at a particular latitude and longitude on the surface of a three-dimensional mixed-reality globe and coupled with free body 402 by one or more springs 406a-406c. Although the example is illustrated and described as comprising a single product or single product group, embodiments contemplate modeling free body 402 and demand centers 404a-404c of the connected demand regions for any number of one or more products and/or any number of one or more product groups, according to particular needs.

At activity 312, mixed-reality visualization system 110 sets a spring constant of one or more springs 406a-406c equal to the demand of each demand region. Continuing with the example of the spring model comprising free body 402 and three demand regions, mixed-reality visualization system 110 sets the spring constant for springs 406a-406c coupling demand centers 404a-404c of each demand region to free body 402 according to the demand of the demand region, as described in more detail below.

A force for each of springs 406a-406c comprising a multiplicative product of the spring constant and a distance connecting each of demand centers 404a-404c of the demand regions to free body 402 representing the potential location of the new distribution center is equal to a cost calculated as the multiplicative product of demand and distance, wherein the stiffness of each of springs 404a-404c corresponds to a demand and length corresponds to a distance between free body 402 and each of demand centers 404a-404c. According to one embodiment, the cost for locating a distribution center using free body 402 is calculated by mixed-reality visualization system 110 using a spring model and Equation 1:

$$F = k^* \Delta d, \tag{1}$$

wherein F represents cost, k represents demand, and $\Delta d$ represents distance from free body 402 to demand center 404a-404c. By way of example only and not by way of limitation, mixed-reality visualization system 110 may calculate the distance between free body 402 and any one or more demand centers 404a-404c according to the difference between longitudes of free body 402 and any one or more demand centers 404a-404c, as a difference in physical distance between free body 402 and any one or more demand centers 404a-404c (such as miles, feet, kilometers, meters, or the like), an area of the surface of a sphere containing free body 402 and any one or more demand centers 404a-404c, and or other like determinations of a distance between free body 402 and any one or more demand centers 404a-404c, according to particular needs. In one embodiment, locating a facility for a particular demand region is based on costs that are specific to a political demand region, such as a taxation policy, regulatory costs, and the like. In other embodiments, where distance is more important a center of a demand region may comprise the center of gravity of the region, which provides a better distance estimate between a demand region and the free body.

At activity 314, free body 402 is placed at a chosen neutral initial position. The location may correspond to a particular latitude, longitude, or other coordinate system for modeling a location on a two- or three-dimensional representational surface that does not hinder or encourage the proximity of the free body to any demand region. In one embodiment, the neutral position comprises a height above the surface of mixed-reality globe visualization 800. According to this embodiment, the neutral position will be influenced by each of the demand regions and simulated gravity of mixed-reality visualization 800, and while the free body falls to the surface of mixed-reality visualization 800, the position of the free body on the surface is influenced by the spring equilibria.

At activity 316, free body 402 reaches a final equilibrium, which represents a desired location of the distribution center. According to embodiments, in response to receiving an input corresponding to a user request for a new location of a distribution center, mixed-reality visualization system 110 will identify the location on mixed-reality globe visualization 800 that comprises an equilibrium point correlating to the distribution center of one or more demand centers 404a-404c.

FIG. 5 illustrates first exemplary scenario 500 comprising demand centers 404a-404c of three demand regions, in accordance with an embodiment. In diagram 400 of the spring model, demand centers 404a-404c are represented by three circles surrounding free body 402, corresponding to a potential location of a new distribution center and represented by a triangle. Although free body 402 is shown and described as a new distribution center, free body 402 may represent any one or more supply chain entities 150, a stocking location, node of supply chain network 100, or the like.

In first exemplary scenario 410, first demand center 404a comprises a demand of 1000 units, a second demand center 404b comprises a demand of 2000 units, and a third demand center 404c comprises a demand of 50 units. Referring to diagram 400 of the spring model, free body 402 is located closest to first demand center 404a and second demand center 404b because first demand center 404a and second demand center 404b have much greater demand than third demand center 404c, and the equilibrium state of three springs 406a-406c coupled with free body 402 results in the calculated free body 402 location (i.e. the location where the new distribution center would be sited to minimize the distance over which items would be transported to meet a demand, all other costs being equal). By way of further explanation only and not by way of limitation, an example is now given with third demand center 404c located on a perpendicular line bisecting a line segment joining first demand center 404a and second demand center 404b. Continuing with this example, when the distance between first demand center 404a and second demand center 404b is 300 miles, the final position of the free body will reach equilibrium at a position located on the line segment approximately 200 miles away from first demand center 404a.

FIG. 6 illustrates second exemplary scenario 600 comprising demand centers 404a-404c of three demand regions, in accordance with an embodiment. In second exemplary scenario 600, demand at first demand center 404a, second demand center 404b, and third demand center 404c are adjusted from 1000 units, 2000 units, and 50 units, respectively, to 100 units, 200 units, and 5000 units, respectively. Continuing with the example of second exemplary scenario 600, demands at first demand center 404a and second demand center 404b are reduced by tenfold while demand at third demand center 404c is increased by tenfold. In response to the adjustment of demand at first demand center 404a, second demand center 404b, and third demand center 404c, location of free body 402 is pulled in the direction of third demand region 404c because the equilibrium state of three springs 406a-406c coupled with free body 402 gives the new free body 402 location corresponding to a new location for a distribution center, one or more supply chain entities 150, a stocking location, a node of supply chain network 100, or the like.

By way of further explanation only and not by way of limitation, another example is now given with relative positioning of first body 404a, second body 404b and third body 404c located where third demand center 404c is located on a perpendicular line bisecting a line segment joining first demand center 404a and second demand center 404b. Continuing with this example, when the distance between third body 404c and line segment joining first body 404a and second body 404b is 530 miles, wherein the final equilibrium position of the free-body will be approximately 30 miles from third body 404c in a general direction toward first body 404a and second body 404b, with a slight deviation toward second body 404b.

Figure 7:
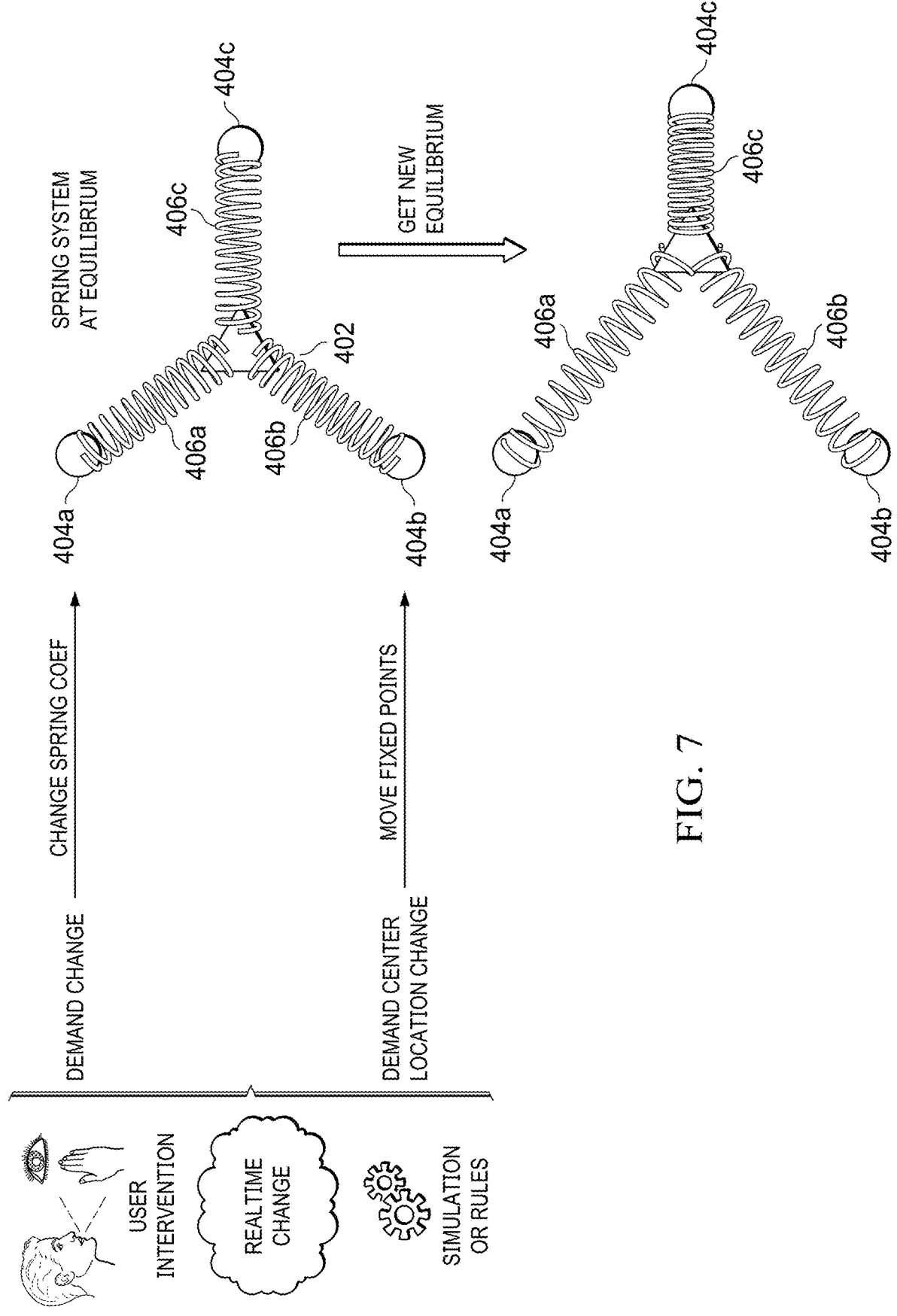
FIG. 7 illustrates what-if scenario of greenfield siting, in accordance with an embodiment.

FIG. 7 illustrates what-if scenario of greenfield siting, in accordance with an embodiment. According to embodiments, mixed-reality visualization system 110 provides for what-if analysis of altered parameters of supply chain network 100 such as, for example, altered demand, altered demand center 404a-404c, and the like using the spring model. In one exemplary embodiment, one or more rendering devices 120 receives a user input, a real-time or simulated parameter or rule change that alters demand at one or more supply chain entities 150 or one or more demand centers 404a-404c. By way of example only and not by way of limitation, an exemplary what-if scenario comprising a demand change and demand center 404a-404c location change are described. Continuing with this example, one or more rendering devices 120 may receive a user input comprising, for example, a voice command, that causes mixed-reality visualization system 110 to retrieve modified demands for one or more supply chain demand regions. Based on the modified demand data for the one or more supply chain demand regions, free body 402 representing the location of the new warehouse or distribution center is updated on mixed-reality user interface 202 to display the location comprising the equilibrium point between the one or more demand regions. In addition, to evaluate the effect of moving one or more warehouses or demand regions, mixed-reality visualization system 110 may generate haptic feedback on the suitability or unsuitability of the move by, for example, altering the speed or motion of movement in response to a user moving a warehouse or demand region on mixed-reality globe visualization 800 of mixed-reality user interface 202. To further illustrate method 300, siting a new warehouse or distribution center location as displayed on mixed-reality globe visualization 800 is described and illustrated below.

Figure 8:
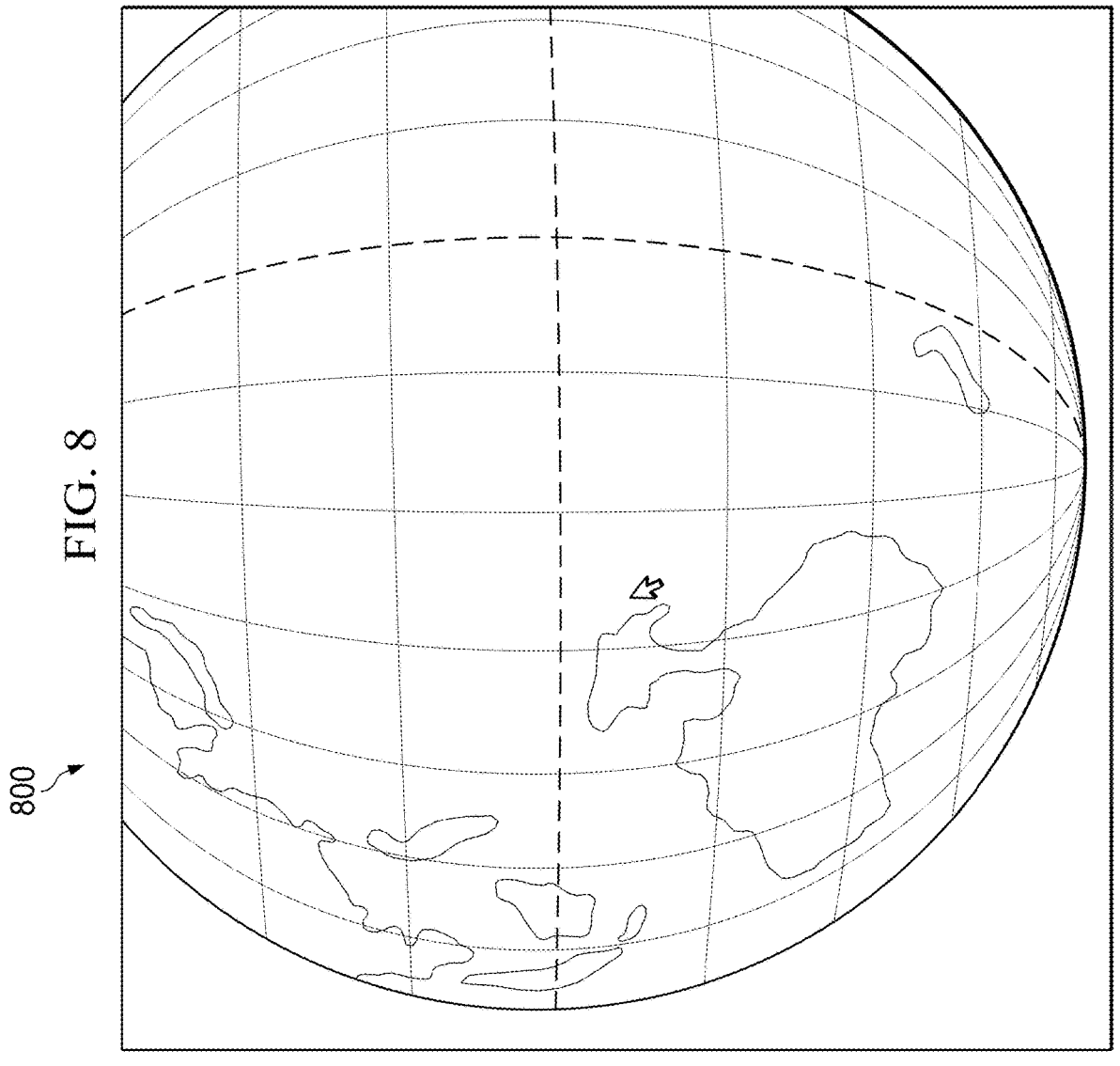
FIG. 8 illustrates a mixed-reality globe visualization, in accordance with an embodiment.

FIG. 8 illustrates mixed-reality globe visualization 800, in accordance with an embodiment. One or more rendering devices 120 may display a user interface or visualization of a supply chain planning or execution application as a three-dimensional representation (such as, for example, virtual reality, augmented reality, and/or mixed-reality). An external view of mixed reality globe visualization 800 comprises a three-dimensional rendering of the surface of the Earth, which may be viewed as a rotatable globe with geographic features and one or more supply chain entities 150 or other resources, materials, or and assets of supply chain network 100 mapped on the surface. Mixed-reality globe visualization 800 may be displayed on one or more rendering devices 120 so that it appears as a three-dimensional globe suspended in front of a user. When supply chain network 100 is relatively local, a user may zoom in or rotate mixed-reality globe visualization 800 to view all nodes of supply chain network 100 in a single view. When supply chain network 100 is not local, mixed-reality visualization system 110 may display an internal view of mixed-reality globe visualization 800.

One or more rendering devices 120 may receive commands from one or more input devices that detect a user's voice commands or gaze and, in response to a detected voice command or change in gaze, alters the user interface or visualization based on the detected voice commands or gaze. For example, in response to one or more rendering devices 120 detecting a voice command saying "hello" or "begin," one or more rendering devices 120 may display mixed-reality globe visualization 800 comprising a three-dimensional mixed-reality representation of the Earth having images, graphics, and text that identify supply chain entities 150, data such as, for example, supply and demand of various entities or regions, movements of items between various stocking points and locations, and the like.

By way of a further example, sensor 122 of one or more rendering devices 120 may monitor and detect whether a user's gaze is fixed on a particular location of mixed-reality globe visualization 800 for a predetermined amount of time. In one embodiment, mixed reality visualization system 110 and/or one or more rendering devices 120 receive data from sensor 122, which monitors the location of particular features of a user's eyes. Mixed-reality visualization system 110 and/or one or more rendering devices 120 may interpret data from sensor 122 as an input representing selection of the location, area, region, or other feature of the mixed-reality globe visualization 800 that is calculated to be the location on which the user's eyes are fixed.

As stated above, embodiments of mixed-reality globe visualization 800 contemplate modeling one or more physical or geographic features such as hills, mountains, roads, rivers, or the like on a three-dimensional or other representational model with which supply chain network 100 and/or supply chain data 132 may be displayed, navigated, and interacted. The nodes of supply chain network 100 may represent a single supply chain entity or a particular region, such as, for example, a political, geographic, census, or other subunit of a geographic area. According to embodiments, the nodes may be associated with demand regions, which are regions whose demand for a particular product or service is tracked by one or more supply chain entities 150. A demand region may be, for example, a continent, country, region, state, metropolitan area, city, neighborhood, or the like. Mixed-reality visualization system 110 maps one or more nodes, regions, demand regions, and/or potential demand regions to mixed-reality globe visualization 800 or other mixed-reality mapped representation by one or more rendering devices 120. According to embodiments, mixed-reality visualization system 110 displays a demand region by placing an icon in a demand center or locational center of the demand region. By way of example only and not by way of limitation, when the demand region comprises a state, the icon may be placed within the demand or geographic center of the state to indicate various qualities or features of the location. According to an embodiment, each icon may represent one or more supply chain entities 150 where the color or shape of the icon indicates behavior of the supply chain at that location. According to one embodiment, mixed-reality visualization system 110 maps one or more nodes to one or more points or areas on mixed-reality globe visualization 800. For example, mixed-reality visualization system 110 maps each of the one or more supply chain entities 150 to the location on mixed-reality globe visualization 800 that corresponds to the real-world location of the one or more supply chain entities 150. As an example of a supply chain node representing a warehouse at KIADB, Bengaluru, India will have latitude of 12.971389 and longitude of 77.750130. The location of this warehouse is mapped to mixed-reality visualization 800 using mixed-reality programming constructs in connection with geo-data, such as, for example, boundaries, shapes, latitude, longitude, and the like.

Figure 9:
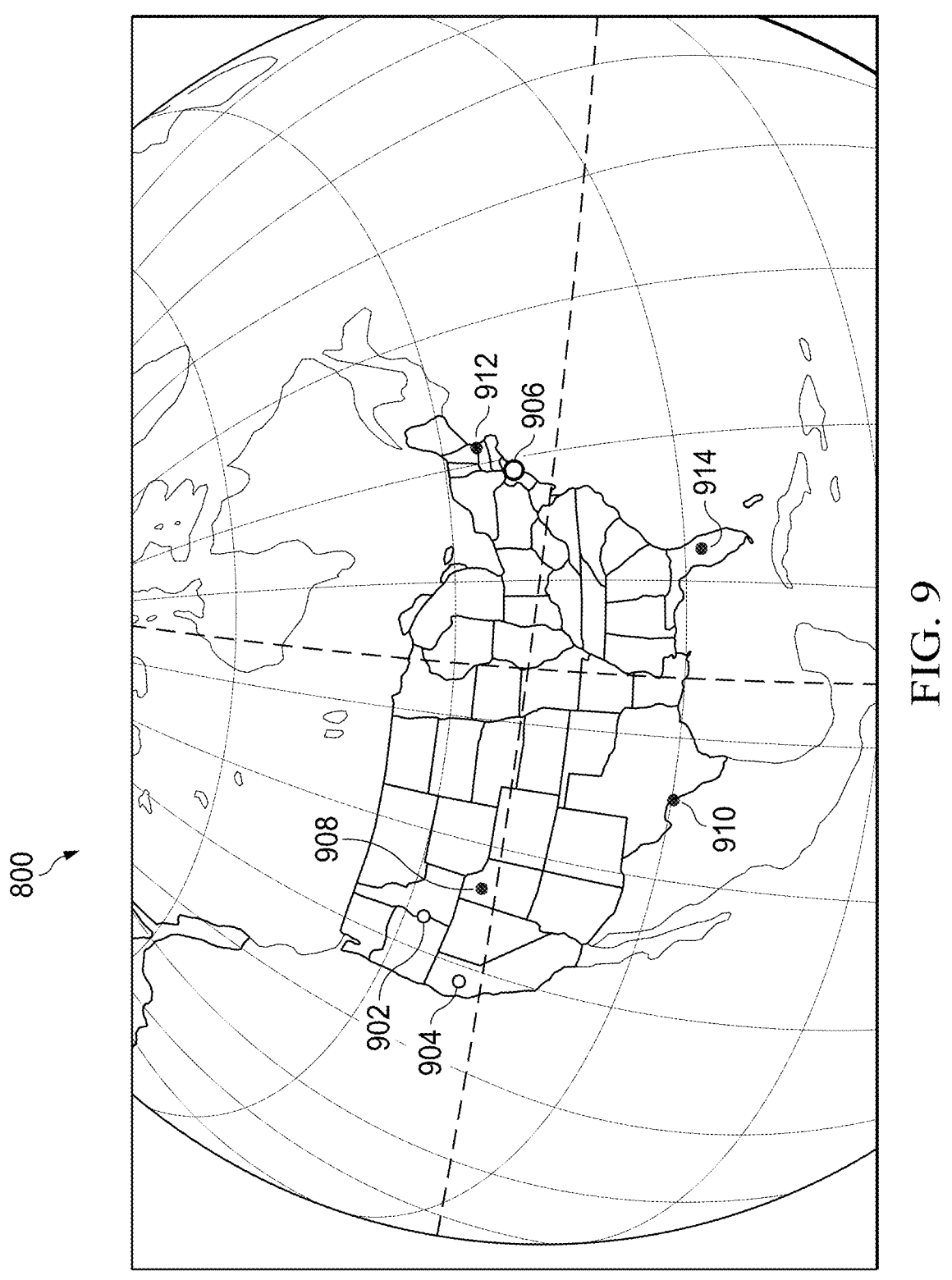
FIG. 9 illustrates a regional view of the mixed-reality globe visualization of FIG. 8, in accordance with an embodiment.

FIG. 9 illustrates a regional view of mixed-reality globe visualization 800 of FIG. 8, in accordance with an embodiment. In response to a user input, mixed reality visualization system 110 may update mixed-reality globe visualization 800 to display a region or subunit of an area illustrating supply chain network 100 related to a received user input. For example, in response to one or more rendering devices 120 detecting a voice command comprising, "How is my supply chain looking today?" one or more rendering devices 120 alter mixed-reality globe visualization 800 to display visual indicators to indicate various qualities or features of one or more supply chain entities 150 or other nodes in supply chain network 100. According to an embodiment, each visual indicator may represent one or more supply chain entities 150 where the color or shape of the visual indicator corresponds to the behavior of one or more supply chain entities 150 at that location. For example, in response to one or more rendering devices 120 detecting a voice command comprising, "What are the problems?" one or more rendering devices 120 alter mixed-reality globe visualization 800 to add visual indicators and display an external view of mixed-reality globe visualization 800. Visual indicators comprise icons, graphics, or text representing nodes of supply chain network 100, which may comprise, for example, one or more supply chain entities 150, resources, materials, or assets of supply chain network 100, free body 402, and/or demand centers 404a-404c of one or more demand regions. In this embodiment, one or more rendering devices 120 maps visual indicators to nodes of mixed-reality globe visualization 800 comprising red icons 902-904 to represent a location corresponding to a problematic node (such as, for example, one or more nodes that are outside the range of a KPI threshold), green icon 906 to represent a location corresponding to a non-problematic node of supply chain network 100 (such as, for example, one or more nodes that are within the range of a KPI threshold), and yellow icons 908-904 to represent locations corresponding to nodes of supply chain network 100 that are nearly problematic (such as, for example, one or more nodes that are near to a minimum or maximum KPI threshold). In addition, or in the alternative, visual indicators may comprise one or more additional icons, graphics, or text indicating supply chain metrics and parameters, including for example, when a KPI threshold is exceeded, the amount the KPI threshold has been exceeded, the location or identify of one or more supply chain entities located at a node that is exceeding the threshold, or other like visual indicators, according to particular needs.

Figure 10:
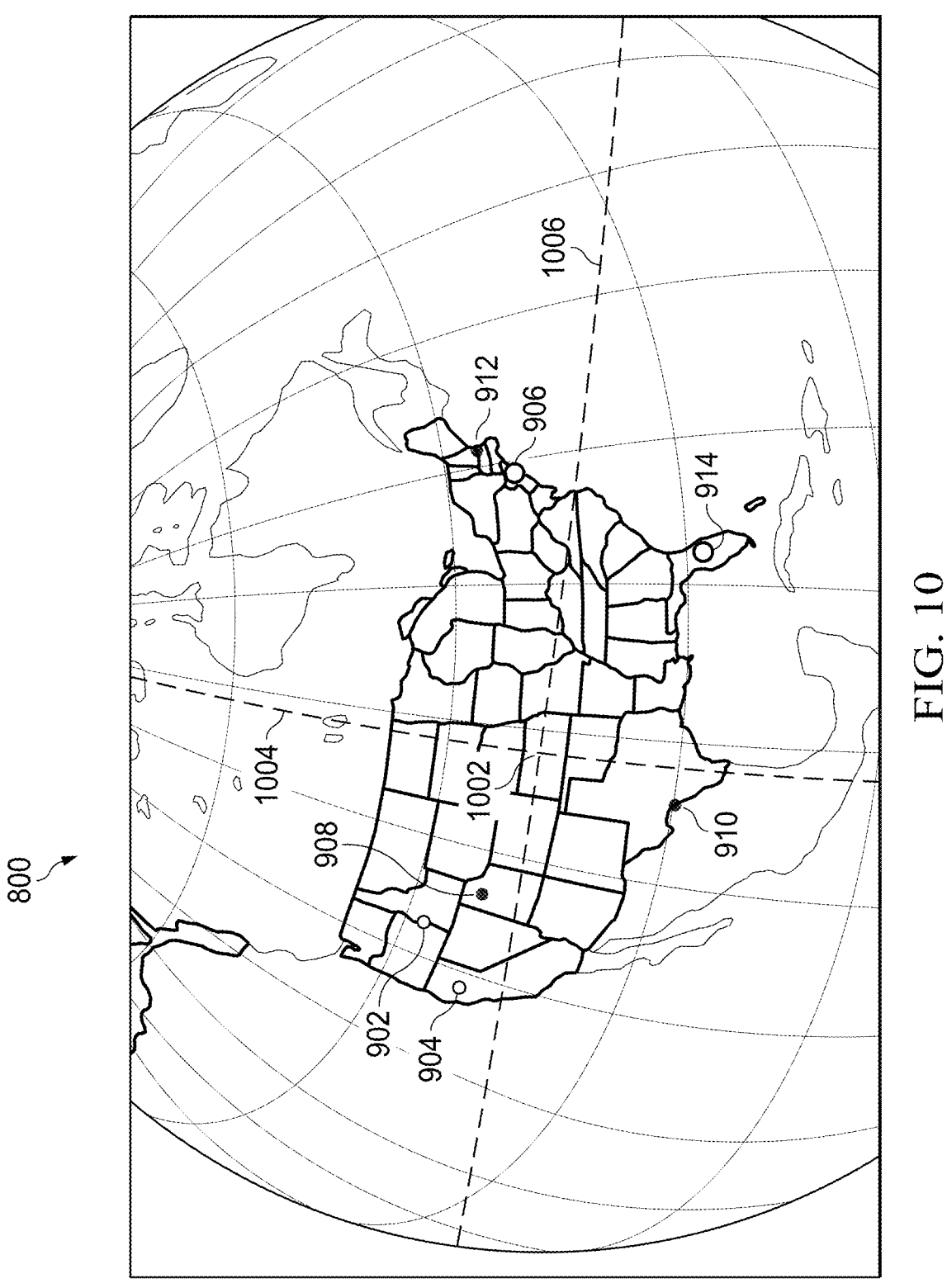
FIGS. 10-13 illustrate siting a new warehouse or distribution center based on one or more demand regions using the mixed-reality globe visualization of FIG. 8, in accordance with an embodiment.

FIG. 10 illustrates siting a new warehouse or distribution center based on one or more demand regions using mixed-reality globe visualization 800 of FIG. 8, in accordance with an embodiment. In response to one or more rendering devices 120 detecting a voice command comprising, "explore new markets," one or more rendering devices 120 rotates mixed-reality globe visualization 800 and displays a map on a surface of mixed-reality globe visualization 800 comprising a demand region (such as, for example, a particular state), with a demand that is not being met by supply chain network 100. According to one embodiment, mixed-reality visualization system 110 retrieves demographic and economic data 260 from cloud datastore 140 and identifies a region having a demographic that indicates a population that is likely to have a demand for one or more products and whose demand is not currently being met by supply chain network 100. In the illustrated embodiment, cursor 1002 (comprising an intersection of cross-hairs 1004-1006) is hovering over the State of Kansas. Continuing with the example of the illustrated embodiment, when cursor 1002 is within a demand region (such as, for example, the State of Kansas), mixed-reality globe visualization 800 alters the appearance of the demand region to indicate the selection of the demand region currently selected by cursor 1002. In addition, embodiments of mixed-reality visualization system 110 may display supply chain metrics indicating the amount of revenue or demand present, or likely to be present, in a current or potential demand region in response to selection by cursor 1002.

Figure 11:
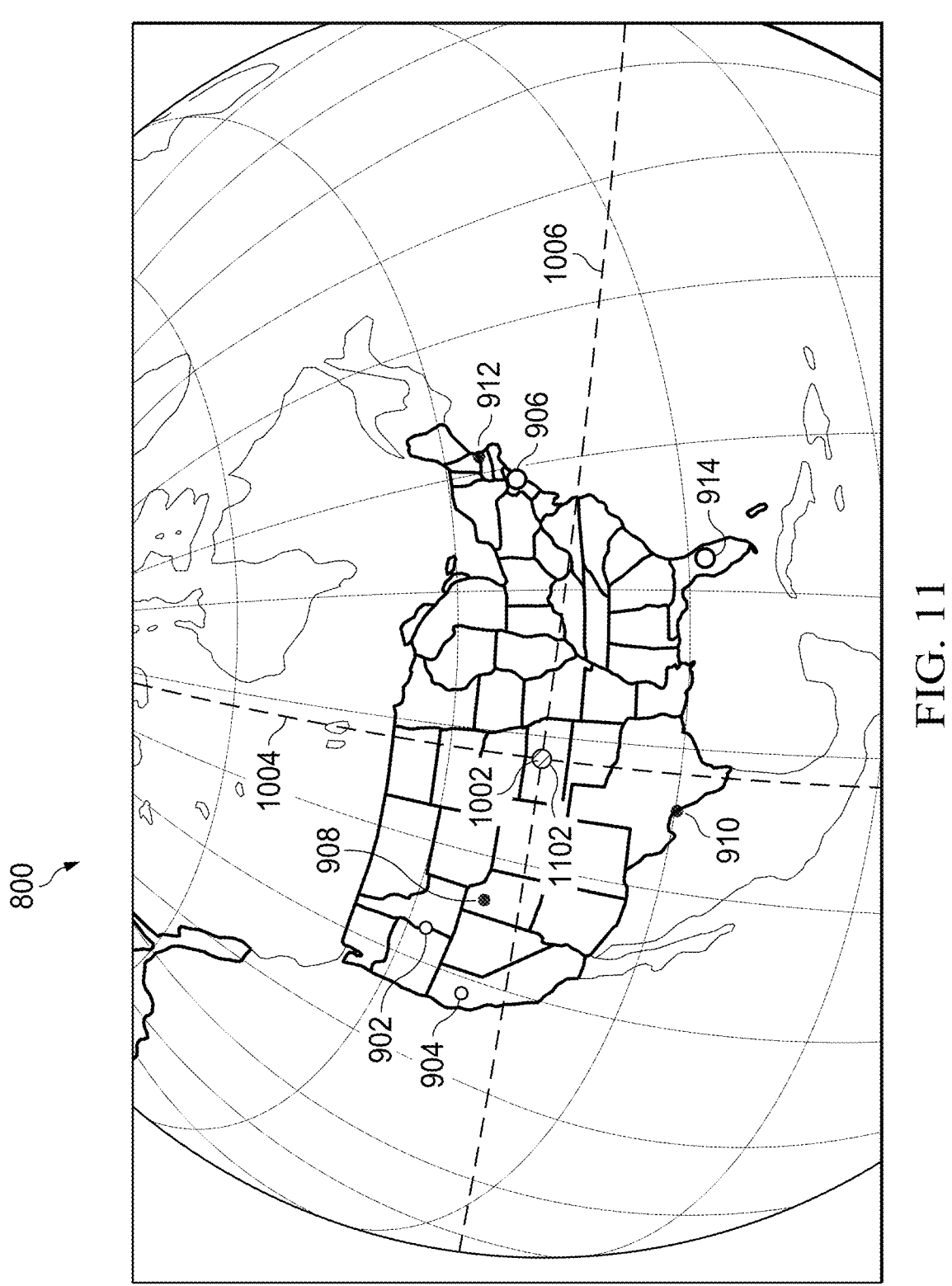

FIG. 11 illustrates siting a new warehouse or distribution center based on one or more demand regions using mixed-reality globe visualization 800 of FIG. 8, in accordance with an embodiment. By way of example only and not by way of limitation, in response to one or more rendering devices 120 detecting a voice command comprising, "select this market," one or more rendering devices 120 map demand center indicator 1102 to demand region selected by cursor 1002. According to one embodiment, mixed-reality globe visualization 800 displays demand center indicator 1102 comprising a spherical graphic in the demand region highlighted by cursor 1002. Continuing with the example of the illustrated embodiment, demand center indicator 1102 was placed in the State of Kansas which is the selected potential demand region selected by cursor 1002. Although the illustrated embodiment comprises selecting a demand region using voice tracking, embodiments contemplate selecting a current or potential demand region using any one or more detected user inputs, such as, for example, one or more of voice tracking, gaze tracking, hand gesture tracking, and incremental discovery, as described in more detail above, according to particular needs.

Figure 12:
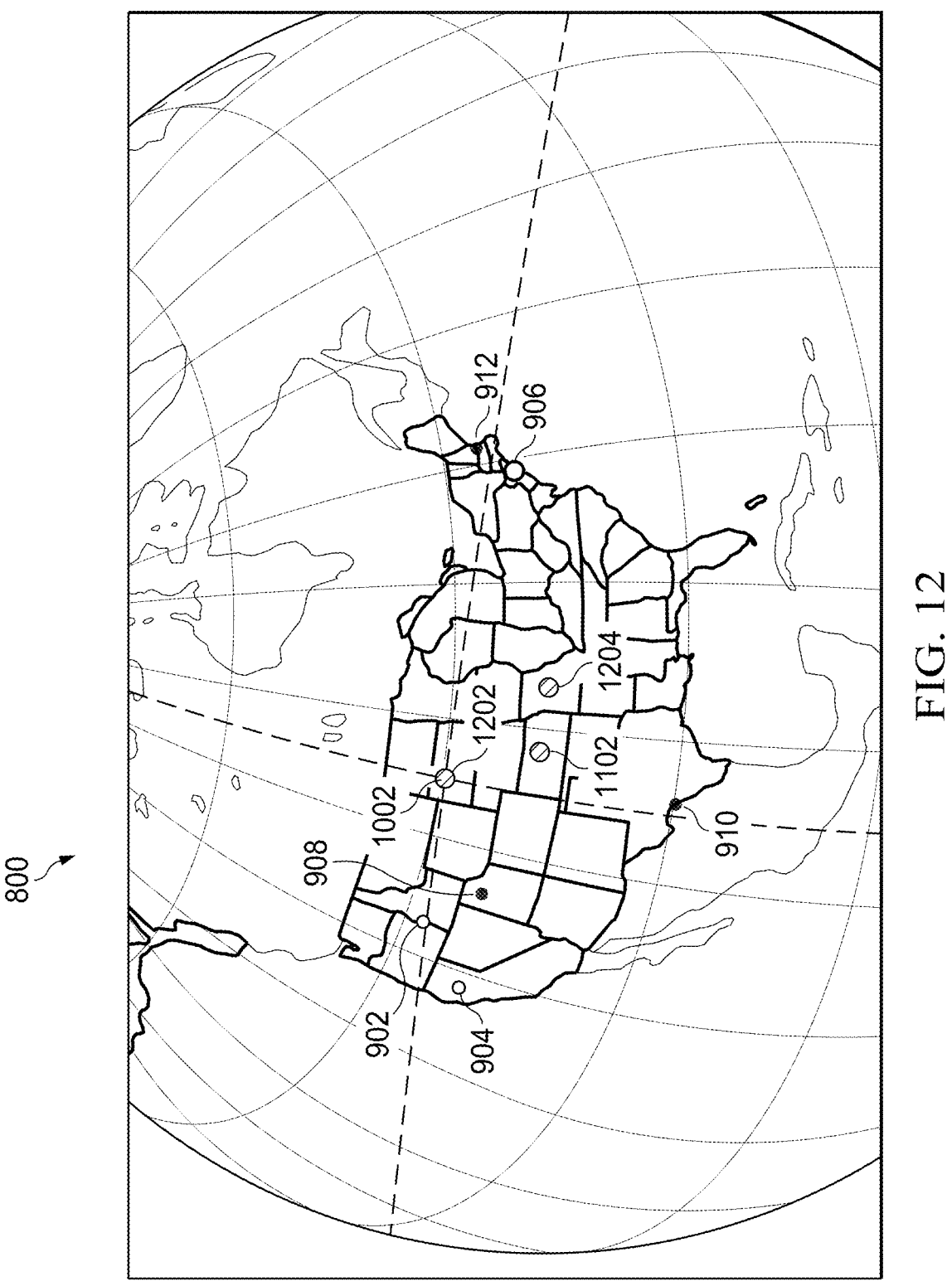

FIG. 12 illustrates siting a new warehouse or distribution center based on one or more demand regions using mixed-reality globe visualization 800 of FIG. 8, in accordance with an embodiment. After placing demand center indicator 1102 in the first demand region, mixed-reality visualization system 110 may place demand center indicators 1202-1204 in additional potential demand regions. For example, in response to one or more rendering devices 120 detecting a voice command comprising, "explore the next market," one or more rendering devices 120 alters mixed-reality globe visualization 800 by placing cursor 1002 on a second demand region, such as, for example, the State of South Dakota. According to embodiments, mixed-reality visualization system 110 creates logical entities in a strategic supply chain network modeling system to enable the service of the demand region that has been added to the market.

After selecting one or more demand regions, mixed-reality visualization system 110 places demand center indicators 1202-1204 in the selected demand regions. Continuing with the previously-described example, selected demand regions are indicated by demand center indicators 1102 and 1202-1204 comprising gray spherical icons displayed in connection with three states: Kansas, South Dakota, and Missouri. Although demand center indicators 1202-1204 are represented using spherical icons placed in the geographical or demand center of the potential demand region, embodiments contemplate demand center indicators 1202-1204 comprising one or more graphics, icons, or other visual element mapped to any location on or near the demand region, including, for example, above or below the three-dimensional surface of mixed-reality globe visualization 800. After potential demand regions are selected, mixed-reality visualization system 110 may determine a location of a distribution center, warehouse, stocking location or the like that minimizes the cost to transport one or more products to meet the demand of the selected demand regions.

Figure 13:
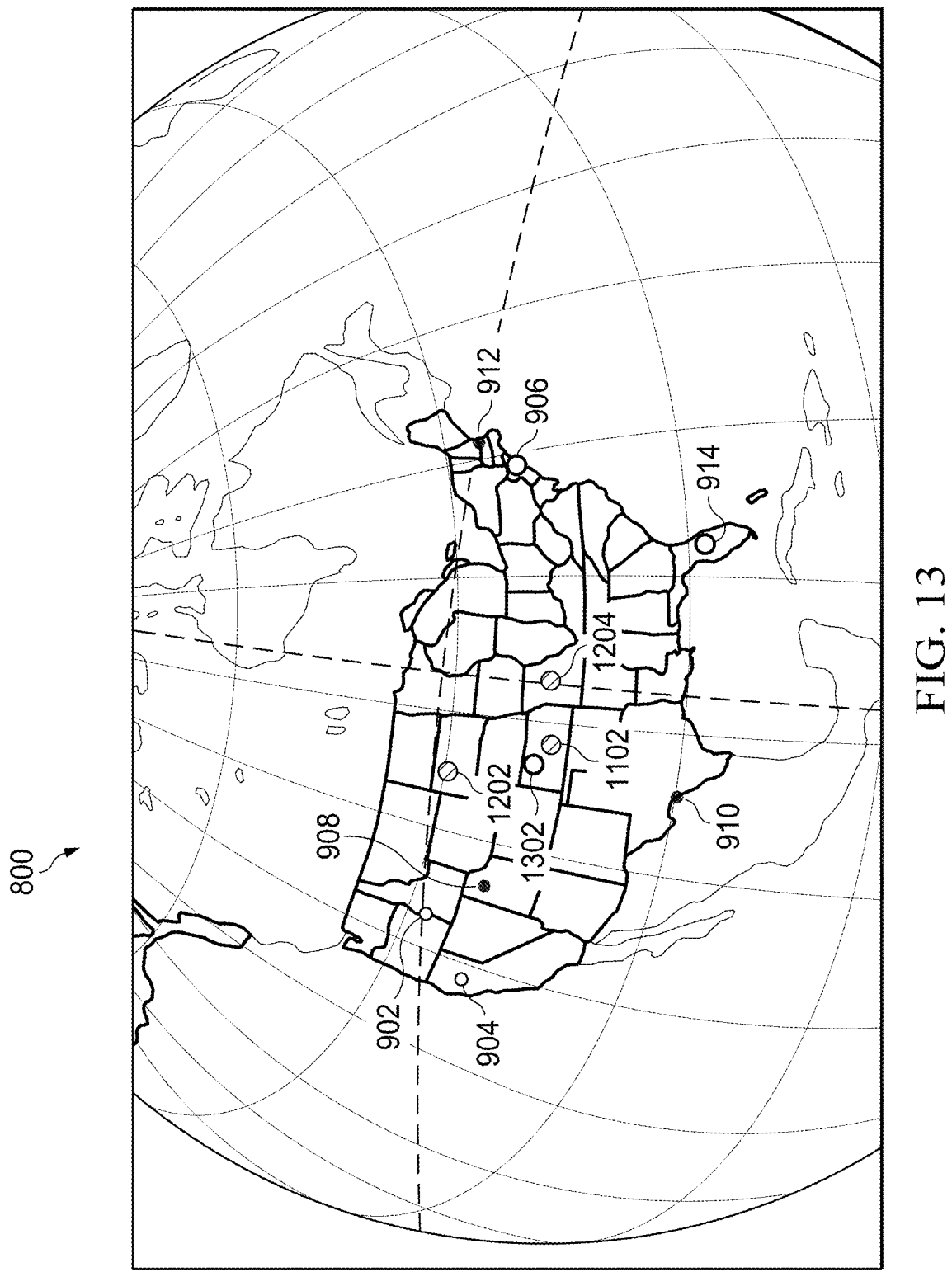

FIG. 13 illustrates siting a new warehouse or distribution center based on one or more demand regions using mixed-reality globe visualization 800 of FIG. 8, in accordance with an embodiment. Using the spring model described above, mixed-reality visualization system 110 identifies a location corresponding to the location of free body 402 that minimizes the cost to transport one or more items to demand centers 404a-404c to meet the demand of the selected demand regions, wherein the demand represents the spring constant of springs 406a-406c. By way of example only and not of limitation, in the illustrated exemplary supply chain network 100 the siting of a new distribution center that minimizes the cost to transport items to the demand regions comprising Kansas, Missouri, and South Dakota is located closer to Kansas and Missouri which have a higher demand for the product than South Dakota. Although a particular location of a distribution center is shown and illustrated for three demand regions, embodiments contemplate locating any number of one or more distribution centers with any number of demand regions, according to particular needs.

In addition and as stated above, mixed-reality visualization system 110 may provide for visualizing effects of one or more what-if scenarios including, for example, moving demand centers 404a-404c of one or more demand regions, the location of the one or more warehouse or distribution center locations, altering one or more supply chain metrics or parameters, and the like. Embodiments contemplate altering the demand of the one or more demand regions by increasing or decreasing the demand to identify the effects of variability in the demand to the location of a warehouse or distribution center that minimizes transportation costs of one or more items. Continuing with this example, a demand at a location may be increased and decreased by a particular percentage (such as, for example 10% or some other suitable margin) to illustrate the suitability of a particular area for siting the location of a distribution center or warehouse based on changes in demand over a future time period. Although a particular example is illustrated, embodiments contemplate visualization of any suitable what-if scenarios, according to particular needs.

Reference in the foregoing specification to "one embodiment", "an embodiment", or "some embodiments" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A mixed-reality visualization system, comprising:
a computer comprising a processor and a memory, the computer configured to:
   render a mixed-reality three-dimensional surface comprising an area;
   detect a command comprising a request associated with a demand;
   retrieve demographic data and economic data from a datastore;
   identify a region having a demographic associated with the demand;
   render, on a virtual reality (VR) rendering device, a visual indicator and an aural indicator within an area corresponding to a determined location based on a calculated equilibrium position of the demand within the identified region, the aural indicator plotted in three-dimensional space to locate the determined location on the rendered mixed-reality three-dimensional surface;

perform one or more what-if scenarios associated with altering the demand of the identified region; and visualize, using the virtual reality (VR) rendering device, one or more effects of the one or more what-if scenarios.

2. The mixed-reality visualization system of claim 1, wherein the detected command comprises a detected gaze.

3. The mixed-reality visualization system of claim 1, wherein the computer is further configured to:

generate haptic feedback on a suitability of the one or more what-if scenarios.

4. The mixed-reality visualization system of claim 3, wherein the haptic feedback comprises altering a motion of movement in response to the one or more what-if scenarios.

5. The mixed-reality visualization system of claim 1, wherein the calculated equilibrium position is based upon a spring model and a simulated gravity.

6. The mixed-reality visualization system of claim 1, wherein the calculated equilibrium position corresponds to a coordinate system for modelling a location on the rendered mixed-reality three-dimensional surface.

7. The mixed-reality visualization system of claim 1, wherein a neutral position corresponding to the calculated equilibrium position within the identified region comprises a height above the rendered mixed-reality three-dimensional surface.

8. A method of mixed-reality visualization, comprising:

rendering a mixed-reality three-dimensional surface comprising an area;

detecting a command comprising a request associated with a demand; retrieving demographic data and economic data from a datastore; identifying a region having a demographic associated with the demand;

rendering, on a virtual reality (VR) rendering device, a visual indicator and an aural indicator within an area corresponding to a determined location based on a calculated equilibrium position of the demand within the identified region, the aural indicator plotted in three-dimensional space to locate the determined location on the rendered mixed-reality three-dimensional surface;

performing one or more what-if scenarios associated with altering the demand of the identified region; and visualizing, using the virtual reality (VR) rendering device, one or more effects of the one or more what-if scenarios.

9. The method of claim 8, wherein the detected command comprises a detected gaze.

10. The method of claim 8, further comprising: generating haptic feedback on a suitability of the one or more what-if scenarios.

11. The method of claim 10, wherein the haptic feedback comprises altering a motion of movement in response to the one or more what-if scenarios.

12. The method of claim 8, wherein the calculated equilibrium position is based upon a spring model and a simulated gravity.

13. The method of claim 8, wherein the calculated equilibrium position corresponds to a coordinate system for modelling a location on the rendered mixed-reality three-dimensional surface.

14. The method of claim 8, wherein a neutral position corresponding to the calculated equilibrium position within the identified region comprises a height above the rendered mixed-reality three-dimensional surface.

15. A non-transitory computer-readable medium embodied with mixed-reality visualization software, the software when executed:

renders a mixed-reality three-dimensional surface comprising an area;

detects a command comprising a request associated with a demand;

retrieves demographic data and economic data from a datastore;

identifies a region having a demographic associated with the demand;

renders, on a virtual reality (VR) rendering device, a visual indicator and an aural indicator within an area corresponding to a determined location based on a calculated equilibrium position of the demand within the identified region, the aural indicator plotted in three-dimensional space to locate the determined location on the rendered mixed-reality three-dimensional surface;

performs one or more what-if scenarios associated with altering the demand of the identified region; and visualizes, using the virtual reality (VR) rendering device, one or more effects of the one or more what-if scenarios.

16. The non-transitory computer-readable medium of claim 15, wherein the detected command comprises a detected gaze.

17. The non-transitory computer-readable medium of claim 15, wherein the software when executed further: generates haptic feedback on a suitability of the one or more what-if scenarios.

18. The non-transitory computer-readable medium of claim 17, wherein the haptic feedback comprises altering a motion of movement in response to the one or more what-if scenarios.

19. The non-transitory computer-readable medium of claim 15, wherein the calculated equilibrium position is based upon a spring model and a simulated gravity.

20. The non-transitory computer-readable medium of claim 15, wherein the calculated equilibrium position corresponds to a coordinate system for modelling a location on the rendered mixed-reality three-dimensional surface.

* * * * *